(12) United States Patent
Stachowiak

(10) Patent No.: US 7,090,921 B2
(45) Date of Patent: Aug. 15, 2006

(54) LOW-E COATING WITH HIGH VISIBLE TRANSMISSION

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/892,250

(22) Filed: Jul. 16, 2004

(65) Prior Publication Data

US 2005/0175845 A1    Aug. 11, 2005

Related U.S. Application Data

(62) Division of application No. 10/024,613, filed on Dec. 21, 2001, now Pat. No. 6,830,817.

(51) Int. Cl.
    *B32B 17/06*    (2006.01)
(52) U.S. Cl. ............... 428/428; 428/432; 428/697; 428/698; 428/699; 428/701; 428/702; 428/704
(58) Field of Classification Search ............... 428/428, 428/432, 697, 698, 699, 701, 702, 704
    See application file for complete search history.

(56) References Cited

U.S. PATENT DOCUMENTS

| | | | |
|---|---|---|---|
| 3,682,528 A | 8/1972 | Apfel et al. |
| 4,229,066 A | 10/1980 | Rancourt et al. |
| 4,413,877 A | 11/1983 | Suzuki et al. |
| 4,716,086 A | 12/1987 | Gillery et al. |
| 4,799,745 A | 1/1989 | Meyer et al. |
| 4,898,790 A | 2/1990 | Finley |
| 4,965,121 A | 10/1990 | Young et al. |
| 5,071,206 A | 12/1991 | Hood et al. |
| 5,153,054 A | 10/1992 | Depauw et al. |
| 5,201,926 A | 4/1993 | Szczyrbowski et al. |
| 5,296,302 A | 3/1994 | O'Shaughnessy et al. |
| 5,302,449 A | 4/1994 | Eby et al. |
| 5,344,718 A | 9/1994 | Hartig et al. |
| 5,376,455 A | 12/1994 | Hartig et al. |
| 5,377,045 A | 12/1994 | Wolfe et al. |
| 5,521,765 A | 5/1996 | Wolfe |
| 5,557,462 A | 9/1996 | Hartig et al. |
| 5,563,734 A | 10/1996 | Wolfe et al. |
| 5,721,054 A | 2/1998 | Vandiest et al. |
| 5,770,321 A | 6/1998 | Hartig et al. |
| 5,800,933 A | 9/1998 | Hartig et al. |
| 5,834,103 A | 11/1998 | Bond et al. |
| 5,902,505 A | 5/1999 | Finley |
| 5,948,131 A | 9/1999 | Neuman |
| 5,948,538 A | 9/1999 | Brochot et al. |

(Continued)

FOREIGN PATENT DOCUMENTS

DE    42 11 363    10/1993

(Continued)

OTHER PUBLICATIONS

U.S. Appl. No. 10/024,613, filed Dec. 21, 2001.

*Primary Examiner*—Jennifer McNeil
*Assistant Examiner*—G. Blackwell
(74) *Attorney, Agent, or Firm*—Nixon & Vanderhye P.C.

(57) ABSTRACT

Coated articles are provided with an anti-reflection system (s) which enables high visible transmission and/or low visible reflection. Neutral color is also achievable in certain example embodiments. In certain example embodiments, the anti-reflection system(s) is used in conjunction with a double silver (Ag) layer stack which provides low sheet resistance and/or emissivity.

11 Claims, 17 Drawing Sheets

U.S. PATENT DOCUMENTS

| | | |
|---|---|---|
| 6,045,896 A | 4/2000 | Boire et al. |
| 6,059,909 A | 5/2000 | Hartig et al. |
| 6,060,178 A | 5/2000 | Krisko |
| 6,132,881 A | 10/2000 | Hartig et al. |
| 6,231,999 B1 | 5/2001 | Krisko |
| 6,238,781 B1 | 5/2001 | Anderson et al. |
| 6,287,675 B1 | 9/2001 | Guiselin et al. |
| 6,306,525 B1 | 10/2001 | Schicht et al. |
| 6,340,529 B1 | 1/2002 | Ebisawa et al. |
| 6,355,334 B1 | 3/2002 | Rondeau et al. |
| 6,492,619 B1 * | 12/2002 | Sol .......................... 219/203 |
| 6,495,251 B1 | 12/2002 | Arbab et al. |
| 6,576,349 B1 | 6/2003 | Lingle et al. |
| 6,586,102 B1 | 7/2003 | Stachowiak |
| 6,589,658 B1 | 7/2003 | Stachowiak |
| 2002/0021495 A1 | 2/2002 | Lingle |
| 2002/0102352 A1 * | 8/2002 | Hartig et al. ............... 427/165 |

FOREIGN PATENT DOCUMENTS

| | | |
|---|---|---|
| DE | 197 32 978 | 11/1998 |
| WO | WO 98/58885 | 12/1998 |
| WO | WO/02 04375 | 1/2002 |

* cited by examiner

LOW-E COATING WITH HIGH VISIBLE TRANSMISSION

RELATED APPLICATION

This application is a Divisional of application Ser. No. 10/024,613, filed Dec. 21, 2001 now U.S. Pat. No. 6,830,817, which is related to U.S. patent application Ser. No. 09/794,224, filed Feb. 28, 2001 (now U.S. Patent No. 6,576,349), the entire contents of which are hereby incorporated by reference in this application.

BACKGROUND AND SUMMARY OF THE INVENTION

The Ser. No. 09/794,224 application discloses coated articles having the following layer stack, as shown in FIG. 1 herein, from the glass substrate outwardly:

TABLE 1

Example Materials/Thicknesses

| Layer Substrate (1–10 mm) | Preferred Range (Å) | More Preferred (Å) | Example (Å) |
|---|---|---|---|
| $TiO_2$ | 0–400 Å | 50–250 Å | 100 Å |
| $Si_xN_y$ | 0–400 Å | 50–250 Å | 170 Å |
| $NiCrO_x$ | 5–100 Å | 10–50 Å | 18 Å |
| Ag | 50–250 Å | 80–120 Å | 105 Å |
| $NiCrO_x$ | 5–100 Å | 10–50 Å | 16 Å |
| $SnO_2$ | 0–800 Å | 500–850 Å | 650 Å |
| $Si_xN_y$ | 0–800 Å | 50–250 Å | 170 Å |
| $NiCrO_x$ | 5–100 Å | 10–50 Å | 18 Å |
| Ag | 50–250 Å | 80–120 Å | 105 Å |
| $NiCrO_x$ | 5–100 Å | 10–50 Å | 16 Å |
| $SnO_2$ | 0–500 Å | 100–300 Å | 150 Å |
| $Si_3N_4$ | 0–500 Å | 100–300 Å | 250 Å |

In other embodiments of Ser. No. 09/794,224, the bottom titanium oxide layer may be removed or replaced with a silicon nitride layer.

While the aforesaid coated articles described in the Ser. No. 09/794,224 application provide good color, and good ultraviolet (UV) and/or infrared (IR) reflection, increased visible transmission and/or reduced visible reflection would sometimes be desirable.

Neutral color is also desirable for coated articles in certain applications. Many conventional methods of making color of a coated article more neutral result in decreased visible transmission and/or increased visible reflection. Heretofore, it has been difficult to increase visible transmission and reduce visible reflection, while at the same time providing or maintaining rather neutral color and satisfactory solar control or thermal characteristics. Whether a color is "neutral" or not is subjective, and is a function of personal taste. However, generally speaking, color moving toward a neutral color target (e.g., a*=0, b*=0, or some other neutral color target such as transmissive a*=–2 and transmissive b*=–3.4) is desired, although such targets do not have to be met in all embodiments of this invention.

In view of the above, it is an object of certain embodiments of this invention to provide a solar controlling coated article (i.e., an article including at least one and preferably two or more layers such as Ag and/or Au for reflecting IR and/or TV) having increased visible transmission and/or reduced visible reflectance. In certain example non-limiting embodiments of this invention, it is an object to combine such high visible transmission and/or reduced visible reflection with neutral color of the coated article. Alternatively, the use of an improved anti-reflection layer(s) system(s) may enable coatings to have or utilize more robust contact layer(s) (e.g., thicker for better durability) and/or thicker silver (Ag) layer(s) (i.e., improved thermal performance) while maintaining similar transmission characteristics if increased transmission is not a most desired feature (e.g., if durability is a most desired feature).

Another object of this invention is to fulfill one or more of the above-listed objects and/or needs.

DETAILED DESCRIPTION OF EXAMPLE EMBODIMENTS OF THE INVENTION

The instant invention relates to coated articles which may be used in applications including but not limited to insulating glass (IG) window units, monolithic windows, skylight windows, and/or any other type of window. Coated articles according to this invention include an improved anti-reflection layer(s) system for reducing visible reflectance and/or increasing visible transmission in coated articles that provide solar control (e.g., IR and/or UV reflection) functionality. Surprisingly, in certain example embodiments it has been found that certain anti-reflection layer(s) systems of the instant invention can both: (a) improve visible transmission and/or reduce visible reflectance, while at the same time (b) achieving an acceptable neutral color of the resulting coated article.

Figure 2:
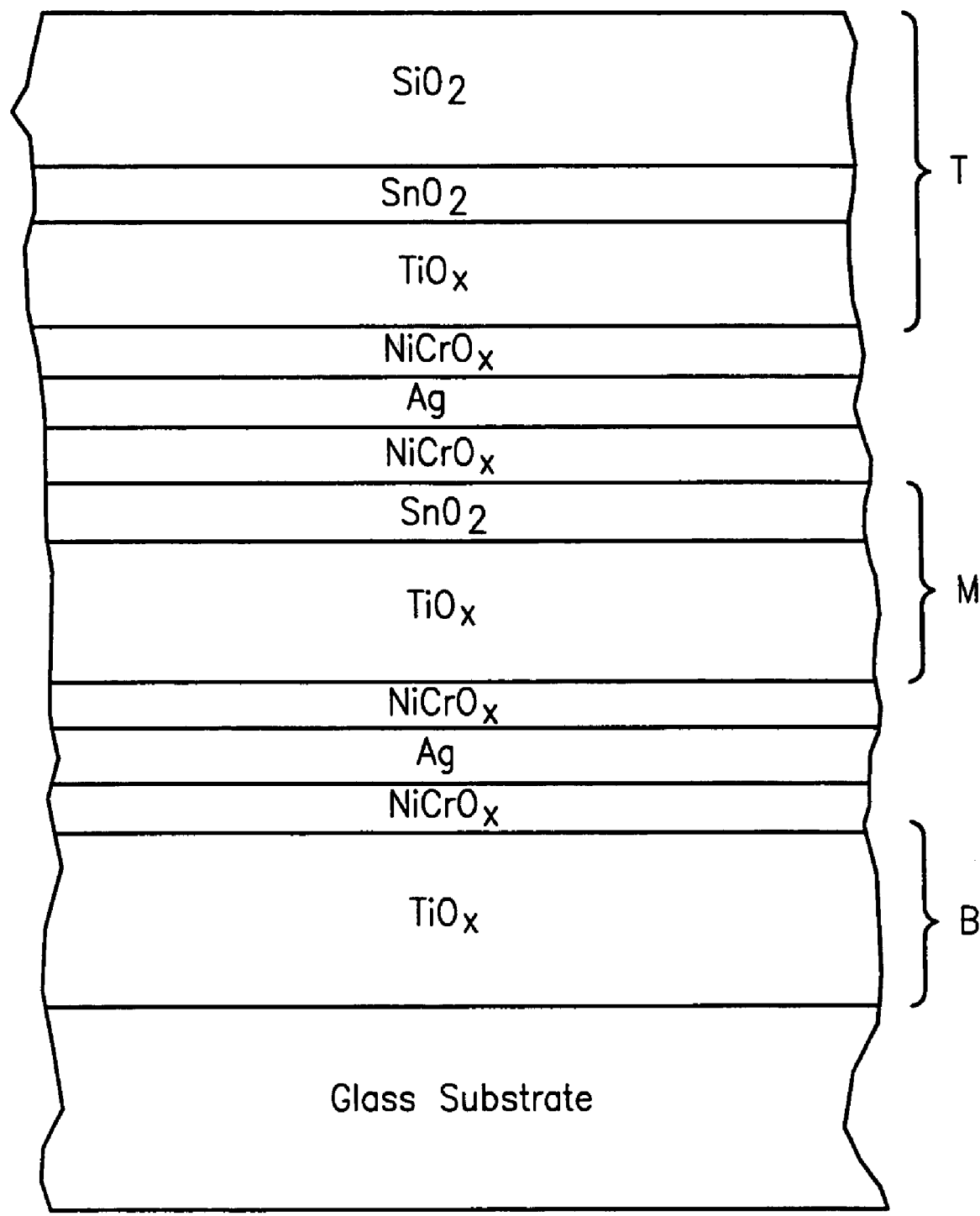
FIG. 2 is a cross sectional view of a coated article according to an embodiment of this invention.

FIG. 2 is a cross sectional view of a coated article according to an embodiment of this invention. The coated article of FIG. 2, like all other coated articles herein, may be used in any of the aforesaid applications (e.g., architectural windows, etc.). The coated article of FIG. 2 includes from the glass substrate outwardly (all indices of refraction "n" at 550 nm):

glass (n=1.51)
titanium oxide (e.g., $TiO_2$) (n=2.1 to 2.7, preferably n=2.4 to 2.65)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., $SnO_2$) (n=1.8 to 2.2, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., $SnO_2$) (n=1.8 to 2.2, preferably n=2.0)
silicon oxide (e.g., $SiO_2$) (n=1.4 to 1.7, preferably n=1.45)
air (n=1.0)

As shown in FIG. 2, the contact layers (i.e., $NiCrO_x$ layers) surround and contact the IR reflecting Ag layers. The $NiCrO_x$ layers herein are called "contact" layers because they each contact an IR reflecting layer (i.e., an Ag layer). The $NiCrO_x$ contact layers provide the most immediate chemical protection for the Ag layer, and also serve as adhesion and/or nucleation layers. The contact layers may or may not be oxidation graded as described in the Ser. No. 09/794,224 application, in different embodiments of this invention. Moreover, instead of $NiCrO_x$, one or more of the contact layers may be of or include other material(s) including but not limited to NiCr, $NiCrN_x$, $NiCrO_xN_y$, ZnO, $Al_2O_3$, $TiO_2$, $ZnAlO_x$, Ni, Cr, $CrN_x$, $NiO_x$, $NbO_x$, any combination thereof, and/or the like. Moreover, in any embodiment herein, materials such as titanium oxide or niobium oxide could even serve as top contact layers (i.e., above Ag layer(s)), in addition to dielectrics herein. Example thicknesses of the contact layers, and other layers herein, are discussed above in the Background and Summary section of this application. The above applies to contact layers in the FIGS. 1–17 embodiments.

Instead of Ag, other metallic IR reflecting materials (e.g., Au, Ag alloys, Au alloys, etc.) may be used for one or more of the IR reflecting layers (this applies to the FIGS. 1–17 embodiments). The thickness of the metallic Ag layers (IR reflecting layers) is chosen in order to achieve the desired thermal performance (see example thickness ranges above). For example, the Ag layer may be from about 50–250 Å thick, in order to achieve sheet resistance ($R_s$) (before and/or after heat treatment) of less than or equal to 10.0 ohms/square, more preferably less than or equal to 8.0 ohms/square, even more preferably less than or equal to 5.0 ohms/square, and most preferably less than or equal to 4.0 ohms/square. In a similar manner, the Ag layer(s) thickness (es) are chosen so that the coating (or coated article) has a normal emissivity ($E_n$) of no greater than 0.08, more preferably no greater than 0.06, and most preferably no greater than 0.05 (before and/or after heat treatment). The aforesaid emissivity and sheet resistance characteristics apply to the FIGS. 1–17 embodiments.

The IR reflecting and contact layers of the FIG. 2 coating (and the FIGS. 3–17 coatings) are discussed in the Ser. No. 09/794,224 application (incorporated herein by reference), and are not discussed herein for reasons of simplicity. See the thicknesses/materials described in the Ser. No. 09/794,224 in this regard. The focus herein lies with the provision of dielectric layers which are utilized in order to: (a) increase visible transmission, (b) decrease visible reflection (e.g., glass side), and/or (c) provide neutral color. With respect to the FIG. 2 embodiment in particular, it will be shown below that the dielectric layers used therein (compared to in FIG. 1) result in a significant increase in visible transmission combined with a decrease in visible reflectance (glass and/or film side). This is beneficial.

Figure 1:
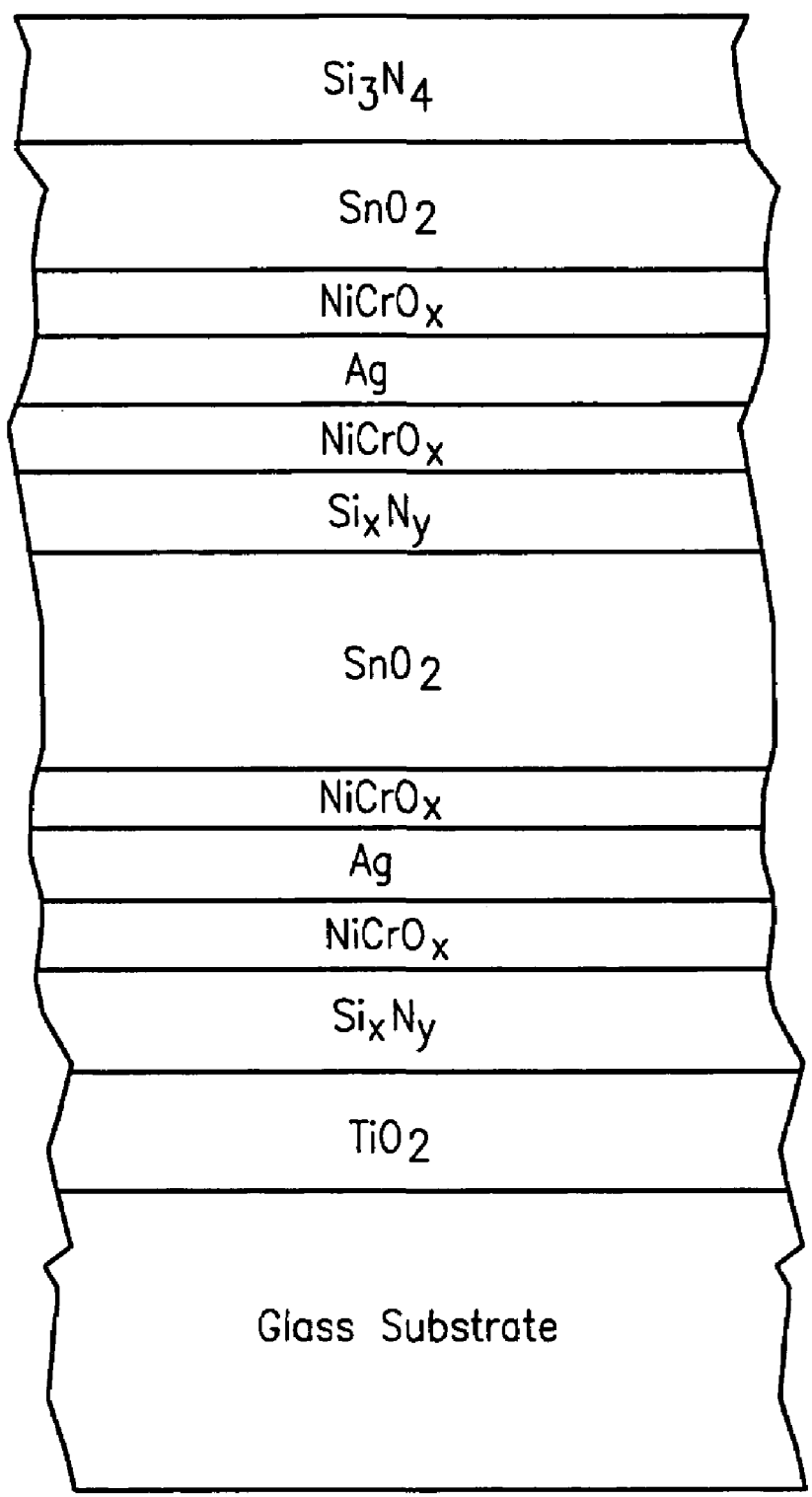
FIG. 1 is a cross sectional view of a coated article according to an embodiment of this invention, as disclosed in the Ser. No. 09/794,224 application.

It can be seen that the FIG. 2 embodiment of this invention differs from FIG. 1 in that (a) the bottom silicon nitride layer from FIG. 1 has been removed, (b) a titanium oxide layer has been added in the middle portion M, (c) the middle silicon nitride layer from FIG. 1 has been removed, (d) titanium oxide and silicon oxide layers have been added to the top portion T of the coating in FIG. 2, and (e) the top silicon nitride layer from FIG. 1 has been removed. By using silicon oxide (i.e., stoichiometric $SiO_2$, or alternatively a non-stoichiometric form) over the top tin oxide layer, and by utilizing the titanium oxide (i.e., stoichiometric $TiO_2$, or alternatively a non-stoichiometric form such as $TiO_{1.50-1.99}$) layers as illustrated, the coating (layer system) can be characterized by the top dielectric portion T having an effective index of refraction n less than that of middle dielectric portion M, which in turn has an effective index of refraction n less than that of the bottom dielectric portion B (see FIG. 2). In other words, $n_T<n_M<n_B$, where $n_T$ is the effective index of refraction of the top dielectric portion T, $n_M$ is the effective index of refraction of the middle dielectric portion M, and $n_B$ is the effective index of refraction of the bottom dielectric portion B (the "effective" index may be calculated as a weighted average of the portion, or by any other suitable technique/method). As shown in FIG. 2, each of the top, middle and bottom dielectric portions T, M and B, respectively, can include a plurality of different dielectric layers, although in alternative embodiments any or all of these portions need only include a single dielectric layer.

By gradually decreasing the respective effective indices of refraction "n" from the innermost or bottom dielectric portion B, to the middle dielectric portion M, and on to the top dielectric portion T toward the air, the anti-reflection system of FIG. 2 enables increased visible transmission and/or reduced visible reflection to be achieved. Surprisingly, as will be shown below in the Examples of this embodiment, the anti-reflection system also enables fairly neutral color of the coated article. Moreover, in certain example embodiments of this invention, $n_T<=2.0$. The silicon oxide layers herein may be from about 10–700 Å thick in certain example embodiments of this invention, more preferably from 20–600 Å thick, and most preferably from 50–500 Å thick. Upper tin oxide layers herein (i.e., in top portion T above the top IR reflecting layer) may be from about 10–700 Å thick in certain example embodiments of this invention, more preferably from 20–600 Å thick, and most preferably from 40–400 Å thick. Upper titanium oxide layers herein (i.e., in top portion T above the top IR reflecting layer) may be from about 10–500 Å thick in certain example embodiments of this invention, more preferably from 40–300 Å thick. Middle titanium oxide layers herein (i.e., in middle portion M between the IR reflecting layers) may be from about 10–900 Å thick in certain example embodiments of this invention, more preferably from 50–700 Å thick. Bottom titanium oxide layers herein (i.e., in bottom portion B below the lower IR reflecting layer) may have thicknesses as discussed in Ser. No. 09/794,224.

As with all embodiments herein, the illustrated layers are preferably deposited/formed via sputtering (see the Examples in the Ser. No. 09/794,224 application), although other deposition techniques may certainly be used in alternative embodiments of this invention.

EXAMPLE(S) OF FIG. 2 EMBODIMENT

The Tables below illustrate Example 1 of the FIG. 2 embodiment, which are to be compared to a Comparative Example(s) (CE) similar to FIG. 1 of the instant application. Thus, the CE relates to a coating that is similar to that illustrated in the Ser. No. 09/794,224 application. For the simulation examples herein, the following indices of refraction were assumed at 550 nm: for glass, n=1.51; for $Si_3N_4$, n=2.0; for $SiO_xN_y$, n=1.72; for $SiO_2$, n=1.45; for $SnO_2$, n=2.0; for $Nb_2O_5$, n=2.33; for $SiZrN_x$, n=2.32; and for $TiO_2$, n=2.57 (note: approximately stoichiometric titanium oxide was assumed in all simulations herein). The thicknesses for each of the layers in the First Table below are in angstroms (Å). The Second Table below sets forth the optical characteristics (e.g., visible transmission, color, etc.) for the Example(s) and CE based upon being annealed and in monolithic form. All glass substrates were the same with respect to thickness and color. The total dielectric parameter simply adds up the total thickness of all dielectric layers in the coating (i.e., does not include Ag or $NiCrO_x$ layers).

It is noted that the examples and comparative examples (CEs) herein utilized more oxided $NiCrO_x$ layers than did the examples in the Ser. No. 09/794,224 application (this explains why the comparative examples herein, in monolithic non-heat-treated form, have higher visible transmission than monolithic non-heat treated products in the Ser. No. 09/794,224). However, this distinction is not relevant because all $NiCrO_x$ layers herein were assumed to have the same amount of oxidation, so that the comparisons herein between the CEs and the Examples are consistent. It is also noted that the indices for all Ag and $NiCrO_x$ layers are assumed to be the same for all such layers in the Examples and the CEs herein. For optical performance (e.g., visible transmission), each of the parameters in the tables below is with respect to Ill. C, 2 degree observer. No example herein was considered heat treated.

FIRST TABLE: LAYER STRUCTURE -
thicknesses (FIG. 2 embodiment)

| Glass | CE | Ex. 1 |
|---|---|---|
| $TiO_2$ | 125 Å | 285 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 615 Å |
| $SnO_2$ | 672 Å | 7 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 230 Å |
| $SnO_2$ | 227 Å | 45 Å |
| $Si_3N_4$ | 252 Å | 0 Å |
| $SiO_xN_y$ | 0 Å | 0 Å |
| $SiO_2$ | 0 Å | 380 Å |
| Total diel: | 1606 Å | 1562 Å |

SECOND TABLE: OPTICAL PERFORMANCE
(FIG. 2 embodiment; monolithic)

|  | $T_{vis}$ | $a^*_t$ | $b^*_t$ | $R_{glass\,side\,(g)}$ | $a^*_g$ | $b^*_g$ | $R_{film\,side\,(f)}$ | $a^*_f$ | $b^*_f$ |
|---|---|---|---|---|---|---|---|---|---|
| Ex. 1: | 79.2% | −0.7 | −0.8 | 4.7% | 4.6 | −4.9 | 3.8% | 3.3 | −2.3 |
| CE: | 75.5% | −2.1 | 0.2 | 5.9% | 9.2 | −10.6 | 5.2% | 3.2 | −1.0 |

It can be seen from the Tables above regarding the FIG. 2 embodiment of this invention, that the anti-reflection system of the instant invention enables not only better visible transmission characteristics (i.e., increased transmission $T_{vis}$ %, Ill. C, 2 deg.), but also reduced reflection (e.g., lower glass side reflection and/or film side reflection). Moreover, fairly neutral transmissive color is also provided. Surprisingly, it can be seen that the FIG. 2 embodiment provides more neutral color (e.g., transmissive a* and glass side reflective) than does the CE. In particular, Example 1 (see FIG. 2) had better visible transmission (higher $T_{vis}$) and better glass and/or film side reflection (lower $R_g$ and/or $R_f$), and more neutral transmissive a*, glass side reflective a*, b* color than the Comparative Example (CE).

Figure 3:
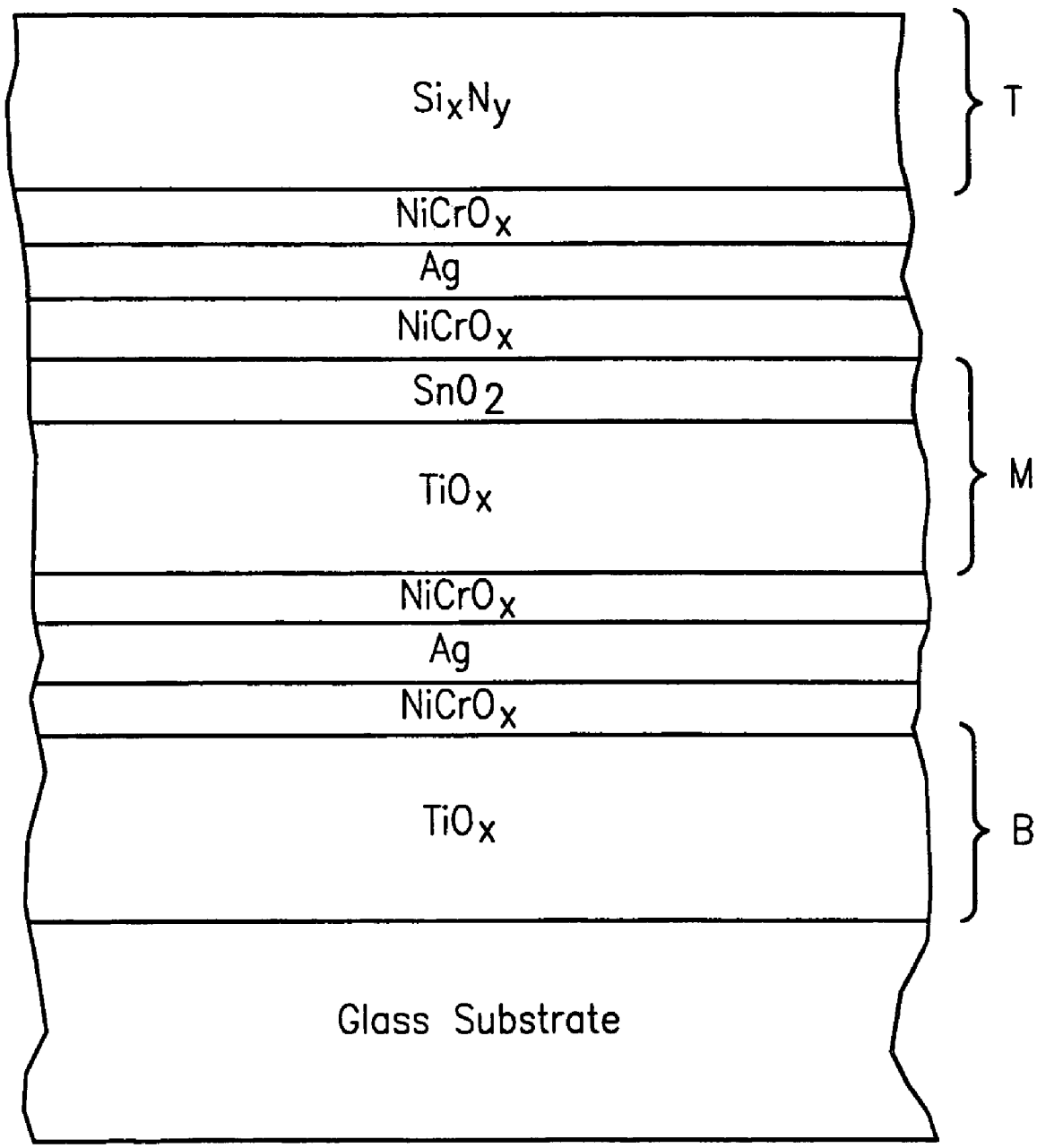
FIG. 3 is a cross sectional view of a coated article according to another embodiment of this invention.

FIG. 3 is a cross sectional view of a coated article according to another embodiment of this invention. The FIG. 3 embodiment differs from the FIG. 2 embodiment in that the top dielectric portion T includes only a silicon nitride layer (stoichiometric $Si_3N_4$, or alternative a non-stoichiometric type of silicon nitride such as but not limited to a Si-rich type). The FIG. 3 embodiment differs from FIG. 1 (i.e., from the CE) in that (a) the bottom silicon nitride layer from FIG. 1 has been removed, (b) a titanium oxide layer has been added in the middle portion M, (c) the middle silicon nitride layer from FIG. 1 has been removed, and (d) the top tin oxide layer from FIG. 1 has been removed. As with all other embodiments herein which use titanium oxide, unless otherwise stated, the titanium oxide may be stoichiometric $TiO_2$, or alternatively a non-stoichiometric form such as $TiO_{1.50-1.99}$. Likewise, as with all other embodiments herein which use silicon nitride, unless otherwise stated the silicon nitride may be stoichiometric ($Si_3N_4$) or non-stoichiometric (e.g., Si-rich). The coated article of FIG. 3 includes from the glass substrate outwardly (all indices n at 550 nm):

glass (n=1.51)
titanium oxide (e.g., $TiO_2$) (n=2.1 to 2.7, preferably n=2.4 to 2.65)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., $SnO_2$) (n=1.8 to 2.2, preferably n=2.0)
nickel-chromium-oxide ($NiCrO_x$)
silver (Ag)
nickel-chromium-oxide ($NiCrO_x$)
silicon nitride (e.g., $Si_3N_4$) (n=1.8 to 2.0, preferably n=2.0)
air (n=1.0)

By using the silicon nitride over the top contact layer in the top dielectric portion T, and the higher index titanium oxide in the middle M and bottom B portion (diluted with the tin oxide in the middle portion M), the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T (i.e., of the silicon nitride layer in this embodiment), $n_M$ is the effective index of refraction of the middle dielectric portion M (i.e., of the tin oxide and titanium oxide layers in this embodiment), and $n_B$ is the effective index of refraction of the bottom dielectric portion B (i.e., of the titanium oxide layer in this embodiment). Each of the top, middle and bottom dielectric portions T, M and B, respectively, can include a plurality of different dielectric layers, although in alternative embodiments any or all of these portions need only include a single dielectric layer (e.g. portions B and T in this FIG. 3 embodiment). By gradually decreasing the respective effective indices of refraction "n" from the innermost or bottom dielectric portion B, to the middle dielectric portion M, and on to the top dielectric portion T toward the air, the anti-reflection system of FIG. 3 enables increased visible transmission to be achieved. The term "effective" means the overall effective index n in a particular portion B, T or M, regardless of how many dielectric layers are provided therein. The anti-reflection system may also enable fairly neutral color of the coated article in certain example embodiments. The silicon nitride layer in portion T may be from about 10–900 Å thick in certain example embodiments of this invention, more preferably from 20–600 Å thick, and most preferably from 50–500 Å thick.

EXAMPLE(S) OF FIG. 3 EMBODIMENT

The Tables below illustrate Example 1 of the FIG. 3 embodiment, compared to a Comparative Example(s) (CE) similar to FIG. 1 of the instant application. Thus, the CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

| FIRST TABLE: LAYER STRUCTURE - thicknesses (FIG. 3 embodiment) | | |
|---|---|---|
| Glass | CE | Ex. 1 |
| $TiO_2$ | 125 Å | 276 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 496 Å |
| $SnO_2$ | 672 Å | 112 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 0 Å |
| $SnO_2$ | 227 Å | 0 Å |
| $Si_3N_4$ | 252 Å | 420 Å |
| $SiO_xN_y$ | 0 Å | 0 Å |
| $SiO_2$ | 0 Å | 0 Å |
| Total diel: | 1606 Å | 1304 Å |

| SECOND TABLE: OPTICAL PERFORMANCE (FIG. 3 embodiment; monolithic) | | | | | | | | | |
|---|---|---|---|---|---|---|---|---|---|
| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
| Ex. 1: | 78.8% | −0.8 | −0.4 | 4.5% | 3.9 | −5.0 | 3.3% | 3.3 | −2.3 |
| CE: | 75.5% | −2.1 | 0.2 | 5.9% | 9.2 | −10.6 | 5.2% | 3.2 | −1.0 |

It can be seen from the Tables above regarding the FIG. 3 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 3) had better visible transmission (higher $T_{vis}$) and better glass and/or film side reflection (lower $R_g$ and/or $R_f$) than the Comparative Example (CE—see FIG. 1). Surprisingly, the Example 1 of this embodiment also had more neutral color than the CE with respect to transmissive a*, and particularly with respect to glass side reflective a*, b*.

Figure 4:
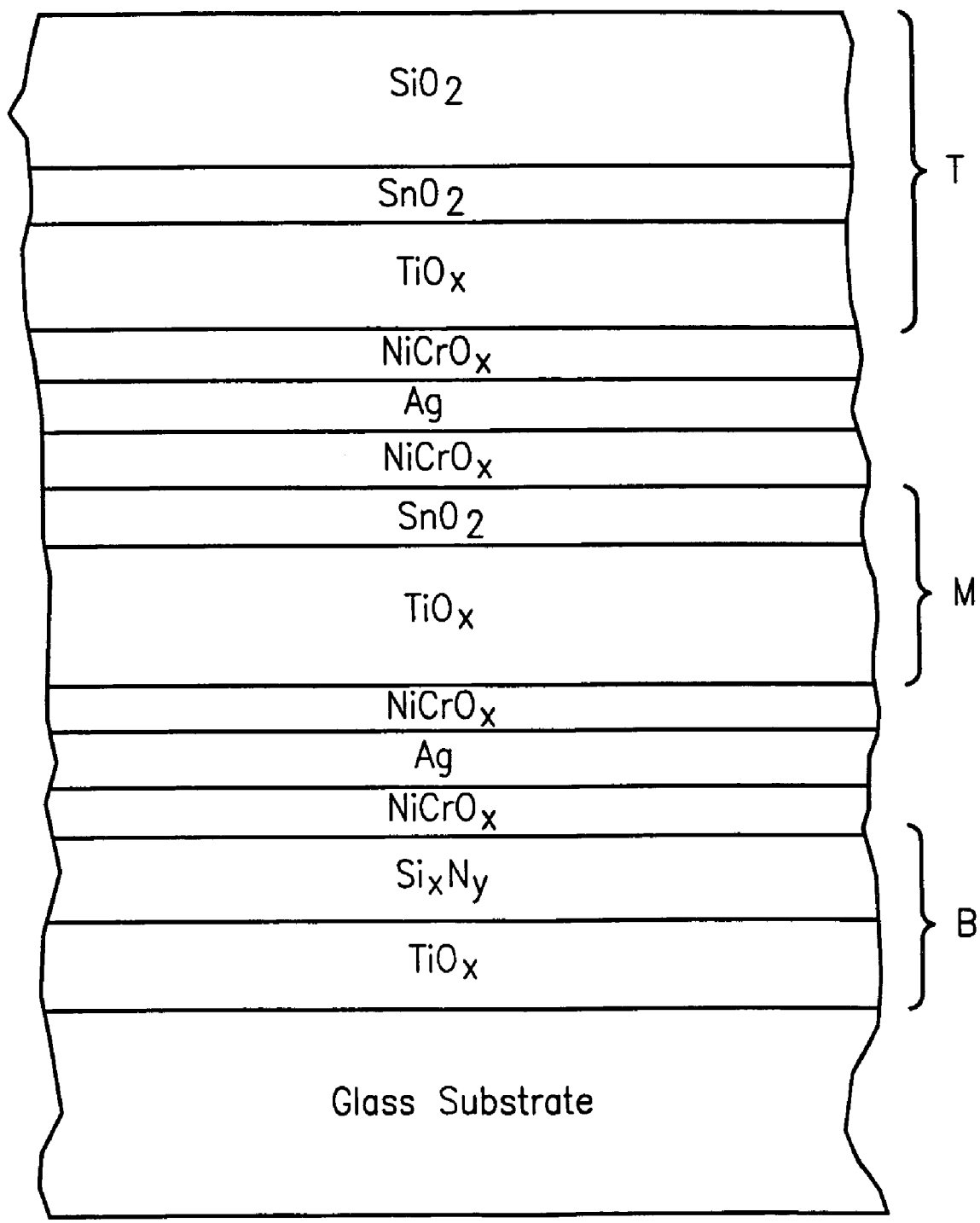
FIG. 4 is a cross sectional view of a coated article according to another embodiment of this invention.

FIG. 4 is a cross sectional view of a coated article according to another embodiment of this invention. The FIG. 4 embodiment differs from the FIG. 2 embodiment in that an additional silicon nitride layer has been added in the bottom dielectric portion B between the lower contact layer and the titanium oxide layer. The term "between" as used herein to state that a layer(s) is "between" layers x and y does not mean that the layer(s) contacts layer x or layer y; it merely means that the layer(s) is between the layers x and y regardless of whether other layer(s) are also between layers x and y. The coated article of FIG. 4 includes from the glass substrate outwardly (all indices n at 550 nm):

glass (n=1.51)
titanium oxide (e.g., $TiO_2$) (n=2.1 to 2.7, preferably n=2.4 to 2.65)
silicon nitride (e.g., $Si_3N_4$) (n=1.8 to 2.0, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., $SnO_2$) (n=1.8 to 2.2, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., $SnO_2$) (n=1.8 to 2.2, preferably n=2.0)
silicon oxide (e.g., $SiO_2$) (n=1.4 to 1.7, preferably n=1.45)
air (n=1.0)

By using the silicon oxide, tin oxide, titanium oxide and silicon nitride dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 4 EMBODIMENT

The Tables below illustrate Examples 1–4 of the FIG. 4 embodiment, compared to a Comparative Example(s) (CE) similar to FIG. 1 of the instant application. Thus, the CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Examples 1–4 and the CE based upon being annealed and in monolithic form.

| FIRST TABLE: LAYER STRUCTURE - thicknesses (FIG. 4 embodiment) | | | | | |
|---|---|---|---|---|---|
| Glass | CE | Ex. 1 | Ex. 2 | Ex. 3 | Ex. 4 |
| $TiO_2$ | 125 Å | 125 Å | 269 Å | 230 Å | 125 Å |
| $Si_3N_4$ | 165 Å | 199 Å | 54 Å | 60 Å | 198 Å |
| $NiCrO_x$ | 18 Å | 18 Å | 18 Å | 18 Å | 18 Å |
| Ag | 98 Å | 98 Å | 98 Å | 98 Å | 98 Å |
| $NiCrO_x$ | 16 Å | 16 Å | 16 Å | 16 Å | 16 Å |
| $TiO_2$ | 0 Å | 481 Å | 219 Å | 120 Å | 120 Å |
| $SnO_2$ | 672 Å | 113 Å | 710 Å | 837 Å | 782 Å |
| $Si_3N_4$ | 165 Å | 0 Å | 0 Å | 0 Å | 0 Å |
| $NiCrO_x$ | 18 Å | 18 Å | 18 Å | 18 Å | 18 Å |
| Ag | 98 Å | 98 Å | 98 Å | 98 Å | 98 Å |
| $NiCrO_x$ | 16 Å | 16 Å | 16 Å | 16 Å | 16 Å |
| $TiO_2$ | 0 Å | 210 Å | 181 Å | 190 Å | 190 Å |
| $SnO_2$ | 227 Å | 34 Å | 32 Å | 32 Å | 10 Å |
| $Si_3N_4$ | 252 Å | 0 Å | 0 Å | 0 Å | 0 Å |
| $SiO_xN_y$ | 0 Å | 0 Å | 0 Å | 0 Å | 0 Å |
| $SiO_2$ | 0 Å | 404 Å | 334 Å | 373 Å | 435 Å |
| Total diel: | 1606 Å | 1566 Å | 1799 Å | 1842 Å | 1860 Å |

| SECOND TABLE: OPTICAL PERFORMANCE (FIG. 4 embodiment; monolithic) | | | | | | | | |
|---|---|---|---|---|---|---|---|---|
| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
| Ex. 1: | 78.3% | −1.5 | −0.1 | 5.0% | 9.1 | −7.1 | 3.9% | 3.8 | −2.4 |
| Ex. 2: | 78.2% | −1.7 | 0.9 | 4.5% | 7.6 | −11.9 | 4.1% | 0.6 | −3.5 |
| Ex. 3: | 78.1% | −1.6 | 0.6 | 4.5% | 5.1 | −9.4 | 4.0% | 2.3 | −3.0 |
| Ex. 4: | 77.8% | −2.1 | 1.2 | 4.5% | 9.2 | −12.4 | 3.9% | 3.9 | −2.4 |
| CE: | 75.5% | −2.1 | 0.2 | 5.9% | 9.2 | −10.6 | 5.2% | 3.2 | −1.0 |

It can be seen from the Tables above regarding the FIG. 4 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Examples 1–4 (see FIG. 4) had better visible transmission (higher $T_{vis}$) and better glass and/or film side reflection (lower $R_g$ and/or $R_f$) than the Comparative Example (CE—see FIG. 1). Fairly neutral color was also achieved in the Example(s).

Figure 5:
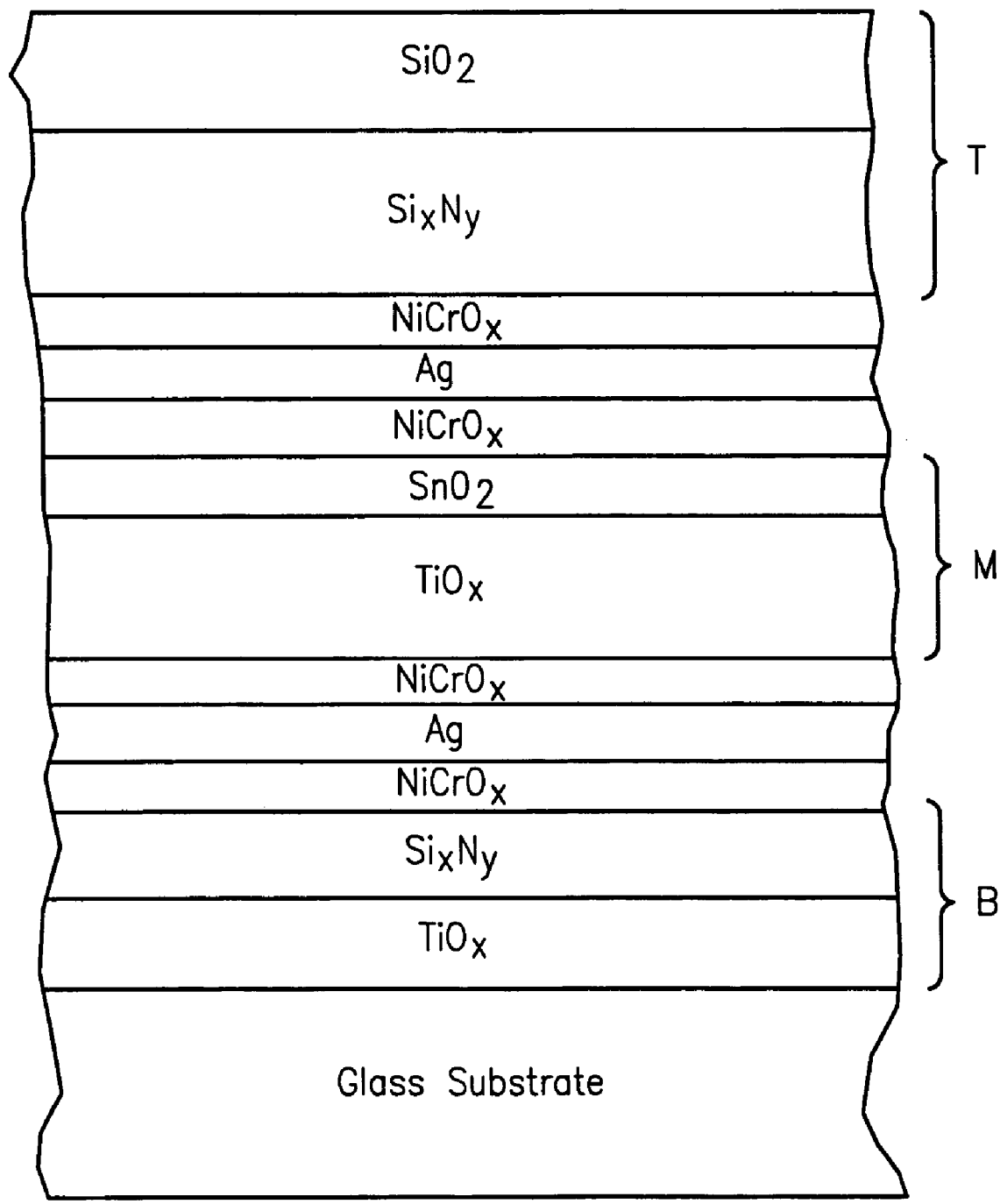
FIG. 5 is a cross sectional view of a coated article according to another embodiment of this invention.

FIG. 5 is a cross sectional view of a coated article according to another embodiment of this invention. The FIG. 5 embodiment differs from the FIG. 3 embodiment in that an additional silicon nitride layer has been added in the bottom dielectric portion B between the lower contact layer and the titanium oxide layer, and a silicon oxide layer has been added over the silicon nitride layer in the top dielectric portion T. The coated article of FIG. 5 includes from the glass substrate outwardly (all indices n at 550 nm):

glass (n=1.51)
titanium oxide (e.g., $TiO_2$) (n=2.1 to 2.7, preferably n=2.4 to 2.65)
silicon nitride (e.g., $Si_3N_4$) (n=1;8 to 2.0, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., $SnO_2$) (n=1.8 to 2.2, preferably n=2.0)
nickel-chromium-oxide ($NiCrO_x$)
silver (Ag)
nickel-chromium-oxide ($NiCrO_x$)
silicon nitride (e.g., $Si_3N_4$) (n=1.8 to 2.0, preferably n=2.0)
silicon oxide (e.g., $SiO_2$) (n=1.4 to 1.7, preferably n=1.45)
air (n=1.0)

By using the silicon oxide, tin oxide, titanium oxide and silicon nitride dielectric layers as shown in this embodiment, the layer system can be characterized by the top dielectric portion T having an effective index of refraction n less than that of middle dielectric portion M, which in turn has an effective index of refraction n less than or equal to that of the bottom dielectric portion B. In other words, $n_T < n_M \leq n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 5 EMBODIMENT

The Tables below illustrate Example 1 of the FIG. 5 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

FIRST TABLE: LAYER STRUCTURE - thicknesses (FIG. 5 embodiment)

| Glass | CE | Ex. 1 |
|---|---|---|
| $TiO_2$ | 125 Å | 125 Å |
| $Si_3N_4$ | 165 Å | 196 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 488 Å |
| $SnO_2$ | 672 Å | 91 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 0 Å |
| $SnO_2$ | 227 Å | 0 Å |
| $Si_3N_4$ | 252 Å | 379 Å |
| $SiO_xN_y$ | 0 Å | 0 Å |
| $SiO_2$ | 0 Å | 147 Å |
| Total diel: | 1606 Å | 1426 Å |

SECOND TABLE: OPTICAL PERFORMANCE (FIG. 5 embodiment; monolithic)

| | $T_{vis}$ | $a^*_t$ | $b^*_t$ | $R_{glass\ side}$ (g) | $a^*_g$ | $b^*_g$ | $R_{film\ side}$ (f) | $a^*_f$ | $b^*_f$ |
|---|---|---|---|---|---|---|---|---|---|
| Ex. 1: | 78.1% | −1.5 | 0.0 | 5.0% | 8.5 | −6.7 | 3.8% | 3.4 | −2.5 |
| CE: | 75.5% | −2.1 | 0.2 | 5.9% | 9.2 | −10.6 | 5.2% | 3.2 | −1.0 |

It can be seen from the Tables above regarding the FIG. 5 embodiment of this invention, that the anti-reflection system of the instant invention enables not only better visible transmission characteristics (i.e., increased visible transmission This %), but also reduced reflection (e.g., lower glass side reflection and/or film side visible reflection). In particular, Example 1 (see FIG. 5) had better visible transmission (higher $T_{vis}$) and better glass and/or film side reflection (lower $R_g$ and/or $R_f$) than the Comparative Example (CE—see FIG. 1). Surprisingly, Example 1 also had more neutral transmissive and glass side reflective color than the CE.

Figure 6:
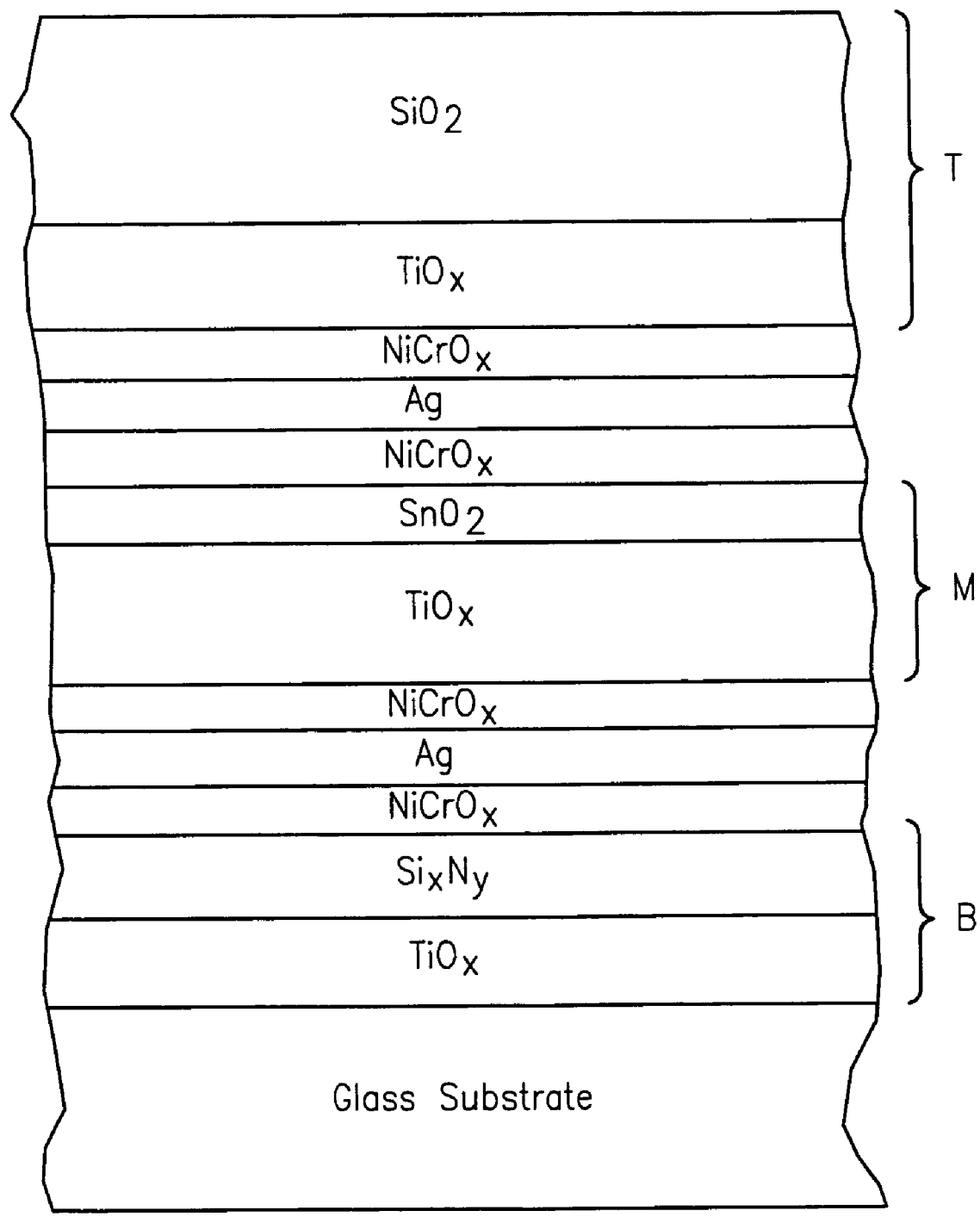
FIG. 6 is a cross sectional view of a coated article according to another embodiment of this invention.

FIG. 6 is a cross sectional view of a coated article according to another embodiment of this invention. The FIG. 6 embodiment differs from the FIG. 2 embodiment in that the upper tin oxide layer in the portion T has been removed from the FIG. 2 embodiment and an additional silicon nitride layer has been added in the bottom dielectric portion B between the lower contact layer and the titanium oxide layer. The coated article of FIG. 6 includes from the glass substrate outwardly (all indices n at 550 nm):

glass (n=1.51)
titanium oxide (e.g., $TiO_2$) (n=2.1 to 2.7, preferably n=2.4 to 2.65)

silicon nitride (e.g., $Si_3N_4$) (n=1.8 to 2.0, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., SnO2) (n=1.8 to 2.2, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
silicon oxide (e.g., $SiO_2$) (n=1.4 to 1.7, preferably n=1.45)
air (n=1.0)

By using the silicon oxide, tin oxide, titanium oxide and silicon nitride dielectric layers as shown in this embodiment, the layer system can be characterized by the top dielectric portion T having an effective index of refraction n less than that of middle dielectric portion M, which in turn has an effective index of refraction n less than or equal to that of the bottom dielectric portion B. In other words, $n_T < n_M \leq n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 6 EMBODIMENT

The Tables below illustrate Example 1 of the FIG. 6 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

| FIRST TABLE: LAYER STRUCTURE - thicknesses (FIG. 6 embodiment) | | |
|---|---|---|
| Glass | CE | Ex. 1 |
| $TiO_2$ | 125 Å | 125 Å |
| $Si_3N_4$ | 165 Å | 201 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 477 Å |
| $SnO_2$ | 672 Å | 71 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 195 Å |
| $SnO_2$ | 227 Å | 0 Å |
| $Si_3N_4$ | 252 Å | 0 Å |
| $SiO_xN_y$ | 0 Å | 0 Å |
| $SiO_2$ | 0 Å | 509 Å |
| Total diel: | 1606 Å | 1578 Å |

| SECOND TABLE: OPTICAL PERFORMANCE (FIG. 6 embodiment; monolithic) | | | | | | | | | |
|---|---|---|---|---|---|---|---|---|---|
|  | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
| Ex. 1: | 78.1% | −1.1 | −0.3 | 4.9% | 4.7 | −2.6 | 3.4% | 2.0 | −4.7 |
| CE: | 75.5% | −2.1 | 0.2 | 5.9% | 9.2 | −10.6 | 5.2% | 3.2 | −1.0 |

It can be seen from the Tables above regarding the FIG. 6 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 6) had better visible transmission (higher $T_{vis}$) and better glass and/or film side reflection (lower $R_g$ and/or $R_f$) than the Comparative Example (CE—see FIG. 1). Surprisingly, Example 1 also had more neutral transmissive and glass side reflective color than the CE.

Figure 7:
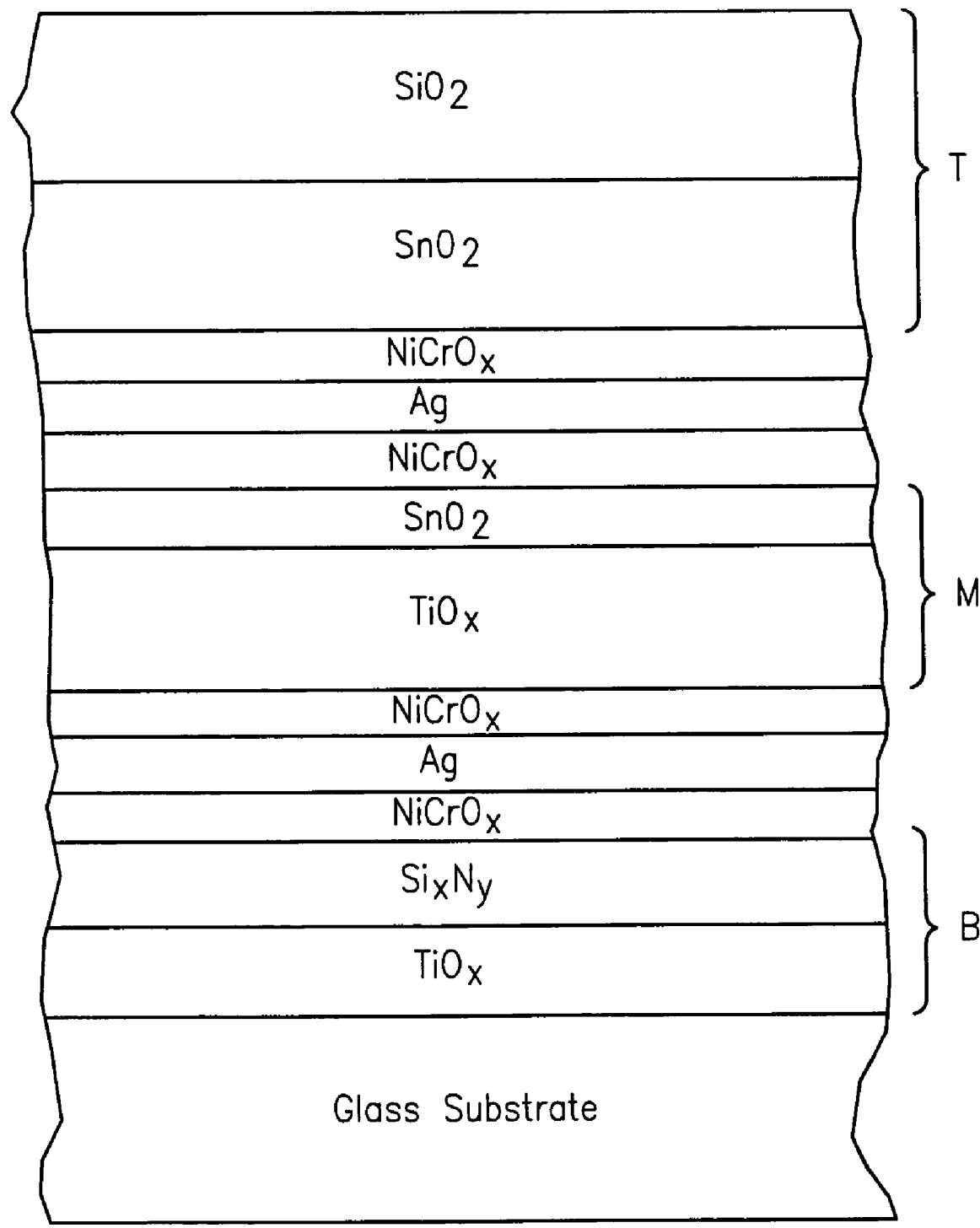
FIG. 7 is a cross sectional view of a coated article according to another embodiment of this invention.

FIG. 7 is a cross sectional view of a coated article according to another embodiment of this invention. The FIG. 7 embodiment differs from the FIG. 2 embodiment in that the upper titanium oxide layer from the FIG. 2 embodiment in portion T has been removed, and an additional silicon nitride layer has been added in FIG. 7 in the bottom dielectric portion B between the lower contact layer and the titanium oxide layer. The coated article of FIG. 7 includes from the glass substrate outwardly (all indices n at 550 nm):

glass (n=1.51)
titanium oxide (e.g., $TiO_2$) (n=2.1 to 2.7, preferably n=2.4 to 2.65)
silicon nitride (e.g., $Si_3N_4$) (n=1.8 to 2.0, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., SnO2) (n=1.8 to 2.2, preferably n=2.0)
nickel-chromium-oxide ($NiCrO_x$)
silver (Ag)
nickel-chromium-oxide ($NiCrO_x$)
tin oxide (e.g., $SnO_2$) (n=1.8 to 2.2, preferably n=2.0)
silicon oxide (e.g., $SiO_2$) (n=1.4 to 1.7, preferably n=1.45)
air (n=1.0)

By using the silicon-oxide, tin oxide, titanium oxide and silicon nitride dielectric layers as shown in this embodiment, the layer system can be characterized by the top dielectric portion T having an effective index of refraction n less than that of middle dielectric portion M, which in turn has an effective index of refraction n less than or equal to that of the bottom dielectric portion B. In other words, $n_T < n_M \leq n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 7 EMBODIMENT

The Tables below illustrate Example 1 of the FIG. 7 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

FIRST TABLE: LAYER STRUCTURE - thicknesses (FIG. 7 embodiment)

| Glass | CE | Ex. 1 |
|---|---|---|
| $TiO_2$ | 125 Å | 125 Å |
| $Si_3N_4$ | 165 Å | 220 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 171 Å |
| $SnO_2$ | 672 Å | 690 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 0 Å |
| $SnO_2$ | 227 Å | 307 Å |
| $Si_3N_4$ | 252 Å | 0 Å |
| $SiO_xN_y$ | 0 Å | 0 Å |
| $SiO_2$ | 0 Å | 222 Å |
| Total diel: | 1606 Å | 1735 Å |

SECOND TABLE: OPTICAL PERFORMANCE (FIG. 7 embodiment; monolithic)

| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. 1: | 77.7% | -2.1 | 1.5 | 4.5% | 10.0 | -13.7 | 3.7% | 3.0 | -2.7 |
| CE: | 75.5% | -2.1 | 0.2 | 5.9% | 9.2 | -10.6 | 5.2% | 3.2 | -1.0 |

It can be seen from the Tables above regarding the FIG. 7 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 7) had better visible transmission (higher $T_{vis}$) and better glass and/or film side reflection (lower $R_g$ and/or $R_f$) than the Comparative Example (CE—see FIG. 1). Surprisingly, Example 1 also had fairly neutral color.

Figure 8:
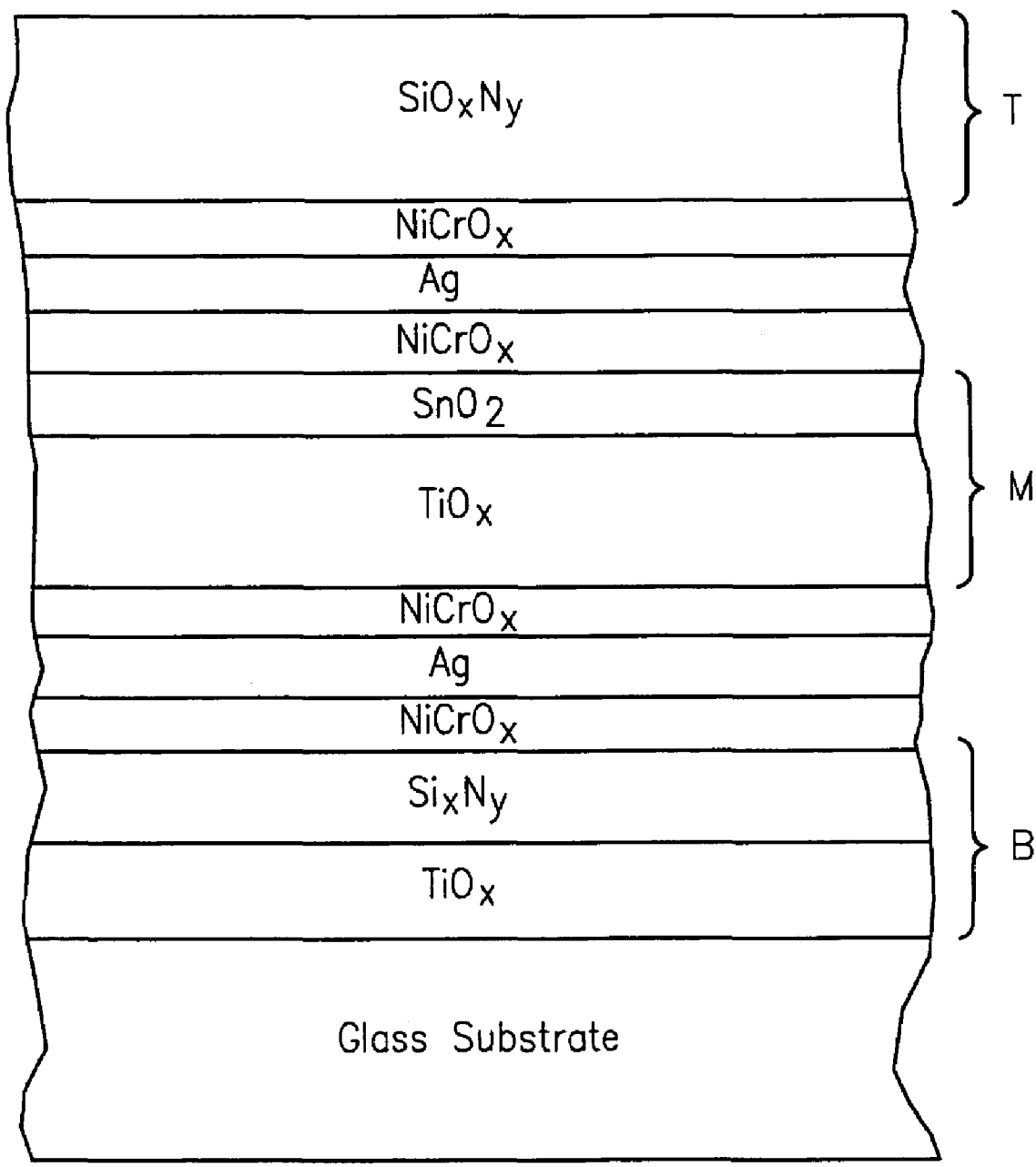
FIG. 8 is a cross sectional view of a coated article according to another embodiment of this invention.

FIG. 8 is a cross sectional view of a coated article according to another embodiment of this invention. The FIG. 8 embodiment differs from the FIG. 4 embodiment in that the upper dielectric portion in the FIG. 8 embodiment includes a silicon oxynitride layer. The silicon oxynitride layer is beneficial in that its index of refraction n (at 550 nm) can be varied from 1.45 to 2.0, more preferably from 1.6 to 1.9, and most preferably from 1.65 to 1.85, in different embodiments of this invention. In this and all other silicon oxynitride inclusive embodiments herein, the silicon oxynitride layer may have a constant (or approximately constant, i.e., constant plus/minus about 5%) index of refraction n throughout its entire thickness in certain embodiments of this invention, but alternatively may be oxidation and/or nitride graded so as to have an index of refraction n which varies through the thickness of the layer (e.g., the index n may gradually decrease through the thickness of the silicon oxynitride layer moving toward the air). The coated article of FIG. 8 includes from the glass substrate outwardly (all indices n at 550 nm):

glass (n=1.51)
titanium oxide (e.g., $TiO_2$) (n=2.1 to 2.7, preferably n=2.4 to 2.65)
silicon nitride (e.g., $Si_3N_4$) (n=1.8 to 2.0, preferably n=2.0)
nickel-chromium-oxide ($NiCrO_x$)
silver (Ag)
nickel-chromium-oxide ($NiCrO_x$)
titanium oxide (e.g., $TiO_2$) (n=2.1 to 2.7, preferably n=2.4 to 2.65)
tin oxide (e.g., $SnO_2$) (n=1.8 to 2.2, preferably n=2.0)
nickel-chromium-oxide ($NiCrO_x$)
silver (Ag)
nickel-chromium-oxide ($NiCrO_x$)
silicon oxynitride (e.g., $SiO_xN_y$) (n=1.45–2.0, preferably n=1.6–1.9)
air (n=1.0)

By using the silicon oxynitride, tin oxide, titanium oxide and silicon nitride dielectric layers as shown in this embodiment, the layer system can be characterized by the top dielectric portion T having an effective index of refraction n (e.g., n=1.72 at 550 nm, as an example of an index n of silicon oxynitride) less than that of middle dielectric portion M, which in turn has an effective index of refraction n less than or equal to that of the bottom dielectric portion B. In other words, $n_T < n_M \leq n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air (not including the Ag or contact layers), the anti-reflection system of this embodiment enables increased visible transmission to be achieved. Surprisingly, the anti-reflection system may also enable fairly neutral color of the coated article in certain example embodiments.

EXAMPLE(S) OF FIG. 8 EMBODIMENT

The Tables below illustrate Example 1 of the FIG. 8 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

| FIRST TABLE: LAYER STRUCTURE - thicknesses (FIG. 8 embodiment) | | |
|---|---|---|
| Glass | CE | Ex. 1 |
| $TiO_2$ | 125 Å | 125 Å |
| $Si_3N_4$ | 165 Å | 173 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 144 Å |
| $SnO_2$ | 672 Å | 665 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $TiO_2$ | 0 Å | 0 Å |
| $SnO_2$ | 227 Å | 0 Å |
| $Si_3N_4$ | 252 Å | 0 Å |
| $SiO_xN_y$ | 0 Å | 503 Å |
| $SiO_2$ | 0 Å | 0 Å |
| Total diel: | 1606 Å | 1610 Å |

| SECOND TABLE: OPTICAL PERFORMANCE (FIG. 8 embodiment; monolithic) | | | | | | | | | |
|---|---|---|---|---|---|---|---|---|---|
| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
| Ex. 1: | 76.8% | −1.6 | 0.9 | 4.8% | 3.1 | −6.5 | 3.4% | 3.7 | −2.8 |
| CE: | 75.5% | −2.1 | 0.2 | 5.9% | 9.2 | −10.6 | 5.2% | 3.2 | −1.0 |

It can be seen from the Tables above regarding the FIG. 8 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 8) had better visible transmission (higher $T_{vis}$) and better glass and/or film side reflection (lower $R_g$ and/or $R_f$) than the Comparative Example (CE—see FIG. 1). Surprisingly, Example 1 also had more neutral glass side reflective color than the CE.

Figure 9:
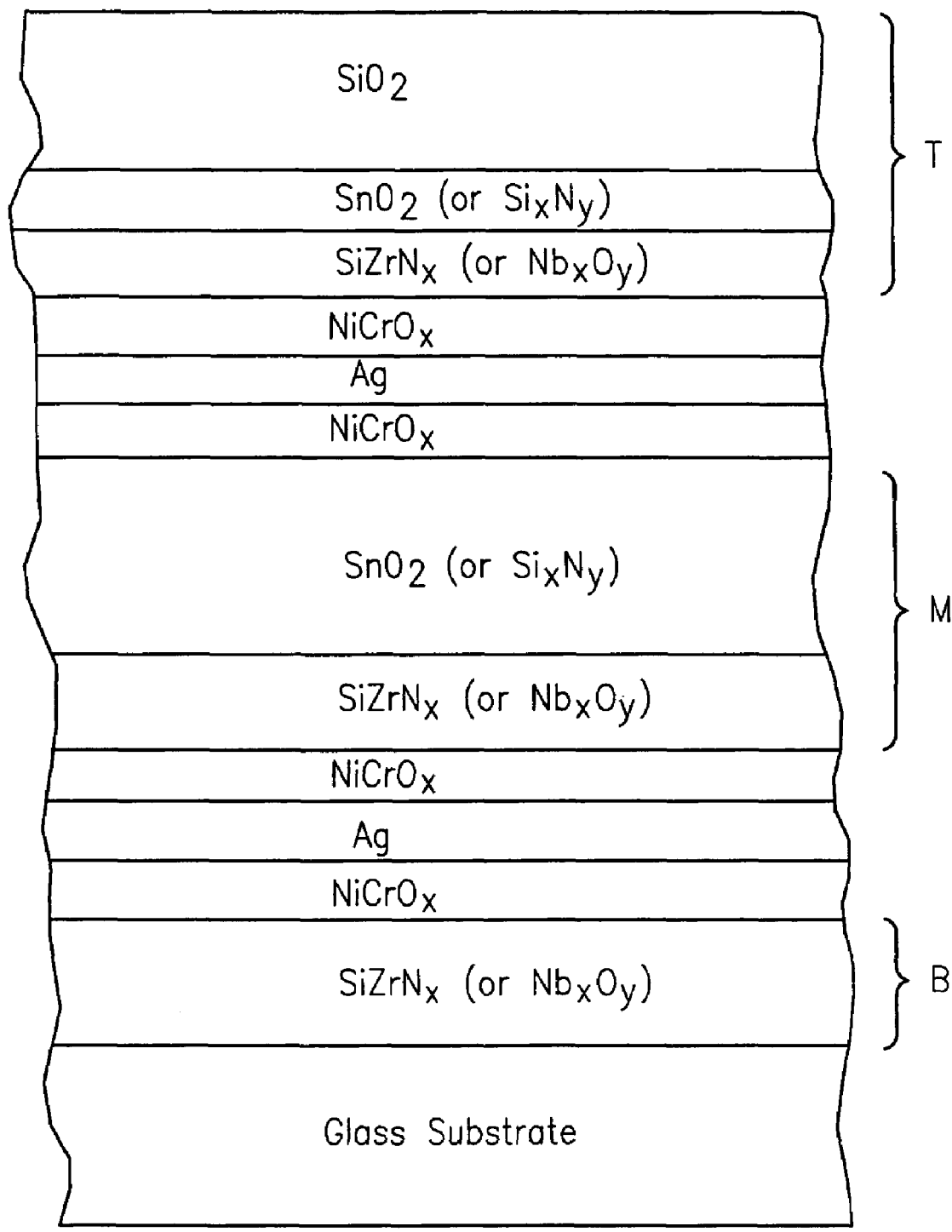
FIG. 9 is a cross sectional view of a coated article according to another embodiment of this invention.

FIG. 9 is a cross sectional view of a coated article according to another embodiment of this invention. The FIG. 9 embodiment differs from FIG. 1 in that (a) the bottom titanium oxide and silicon nitride layers in bottom portion B of FIG. 1 have been removed and replaced with a layer of or including silicon zirconium nitride (SiZrN), (b) the silicon nitride layer in the middle portion M of FIG. 1 has been removed, (c) a layer of or including silicon zirconium nitride has been added to the middle dielectric portion M in FIG. 9, and (d) the top silicon nitride layer in top portion T in FIG. 1 has been replaced with a layer of or including silicon oxide in FIG. 9. It is noted that the silicon zirconium nitride inclusive layers may be stoichiometric or non-stoichiometric in different embodiments of this invention. Moreover, one or more of the silicon zirconium nitride (SiZrN) layers may be oxidized, and/or may be replaced with layer(s) comprising niobium oxide (e.g., $Nb_2O_5$ or any other suitable form). It is also noted that any of the tin oxide layers in portion(s) T and/or M could be replaced with silicon nitride (e.g., stoichiometric or non-stoichiometric). The coated article of FIG. 9 includes from the glass substrate outwardly (all indices n at 550 nm):

glass (n=1.51)
silicon zirconium nitride ($SiZrN_x$) (n=2.2–2.45, preferably n=2.32)
nickel-chromium-oxide ($NiCrO_x$)
silver (Ag)
nickel-chromium-oxide ($NiCrO_x$)
silicon zirconium nitride ($SiZrN_x$) (n=2.2–2.45, preferably n=2.32)
tin oxide (e.g., $SnO_2$) (n=1.8 to 2.2, preferably n=2.0)
nickel-chromium-oxide ($NiCrO_x$)
silver (Ag)
nickel-chromium-oxide ($NiCrO_x$)
silicon zirconium nitride ($SiZrN_x$) (n=2.2–2.45, preferably n=2.32)
tin oxide (e.g., $SnO_2$) (n=1.8 to 2.2, preferably n=2.0)
silicon oxide (e.g., $SiO_2$) (n=1.4 to 1.7, preferably n=1.45)
air (n=1.0)

By using the silicon zirconium nitride, silicon oxide, and tin oxide dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T<n_M<n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 9 EMBODIMENT

The Tables below illustrate Example 1 of the FIG. 9 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

| FIRST TABLE: LAYER STRUCTURE - thicknesses (FIG. 9 embodiment) | | |
|---|---|---|
| Glass | CE | Ex. 1 |
| $SiZrN_x$ | 0 Å | 352 Å |
| $TiO_2$ | 125 Å | 0 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $SiZrN_x$ | 0 Å | 232 Å |
| $SnO_2$ | 672 Å | 680 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $SiZrN_x$ | 0 Å | 125 Å |
| $SnO_2$ | 227 Å | 143 Å |
| $Si_3N_4$ | 252 Å | 0 Å |
| $SiO_xN_y$ | 0 Å | 0 Å |
| $SiO_2$ | 0 Å | 327 Å |
| Total diel: | 1606 Å | 1859 Å |

| SECOND TABLE: OPTICAL PERFORMANCE (FIG. 9 embodiment; monolithic) | | | | | | | | |
|---|---|---|---|---|---|---|---|---|
| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
| Ex. 1: | 77.4% | -2.8 | 3.1 | 4.4% | 7.8 | -11.5 | 3.8% | 3.3 | -2.7 |
| CE: | 75.5% | -2.1 | 0.2 | 5.9% | 9.2 | -10.6 | 5.2% | 3.2 | -1.0 |

It can be seen from the Tables above regarding the FIG. 9 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 9) had better visible transmission (higher $T_{vis}$) and better glass and/or film side reflection (lower $R_g$ and/or $R_f$) than the Comparative Example (CE—see FIG. 1). Surprisingly, Example 1 also had fairly neutral color.

Figure 10:
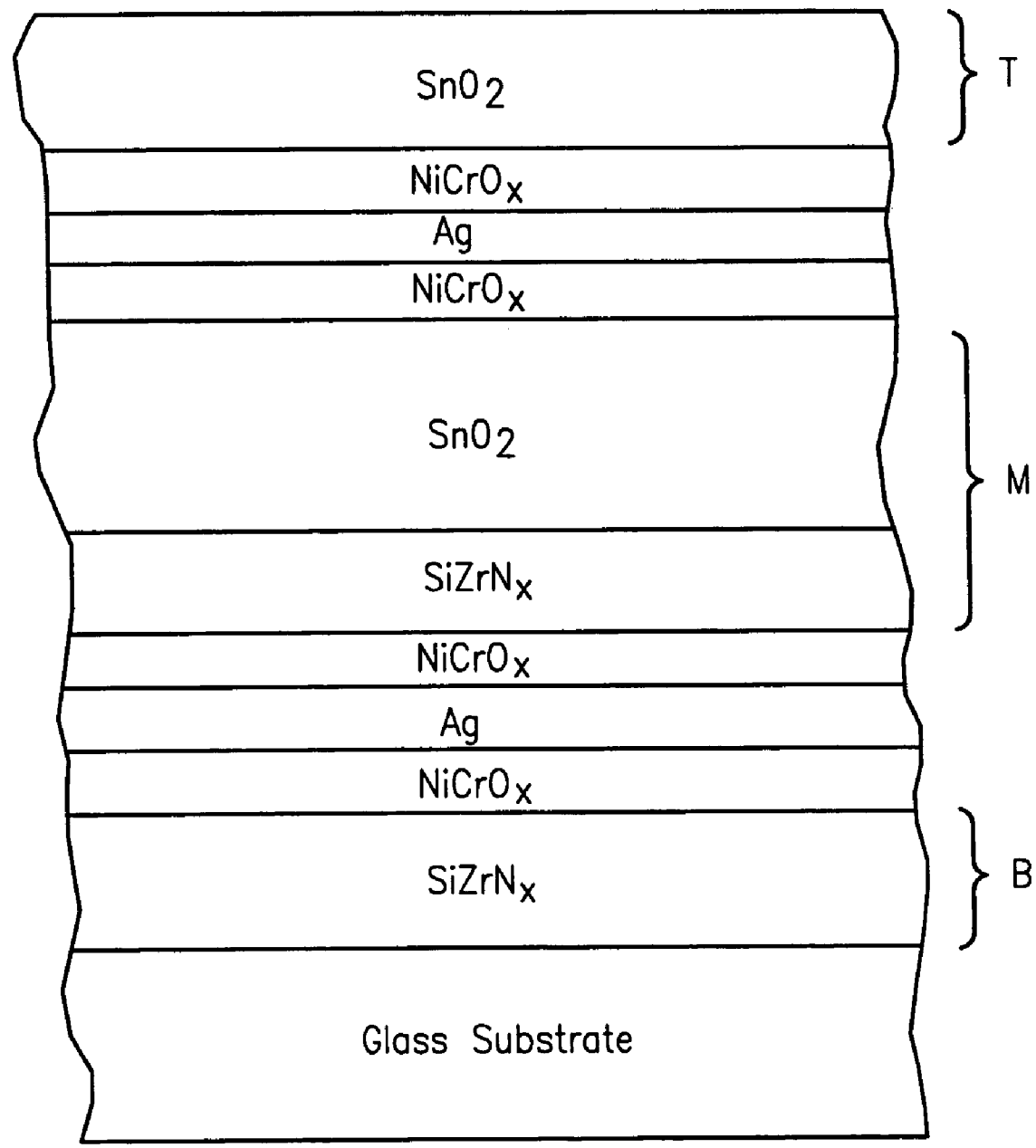
FIG. 10 is a cross sectional view of a coated article according to another embodiment of this invention.

FIG. 10 is a cross sectional view of a coated article according to another embodiment of this invention. The FIG. 10 embodiment differs from the FIG. 9 embodiment in that the upper silicon oxide and SiZrN inclusive layers in the top dielectric portion T have been removed. It is noted that the silicon zirconium nitride inclusive layers may be stoichiometric or non-stoichiometric in different embodiments of this invention. Moreover, one or more of the silicon zirconium nitride (SiZrN) layers may be oxidized, and/or may be replaced with layer(s) comprising niobium oxide (e.g., $Nb_2O_5$ or any other suitable form). The coated article of FIG. 10 includes from the glass substrate outwardly (all indices n at 550 nm):

- glass (n=1.51)
- silicon zirconium nitride ($SiZrN_x$) (n=2.2–2.45, preferably n=2.32)
- nickel-chromium-oxide ($NiCrO_x$)
- silver (Ag)
- nickel-chromium-oxide ($NiCrO_x$)
- silicon zirconium nitride ($SiZrN_x$) (n=2.2–2.45, preferably n=2.32)
- tin oxide (e.g., $SnO_2$) (n=1.8 to 2.2, preferably n=2.0)
- nickel-chromium-oxide ($NiCrO_x$)
- silver (Ag)
- nickel-chromium-oxide ($NiCrO_x$)
- tin oxide (e.g., SnO2) (n=1.8 to 2.2, preferably n=2.0)
- air (n=1.0)

By using the silicon zirconium nitride, silicon oxide, and tin oxide dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T<n_M<n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 10 EMBODIMENT

The Tables below illustrate Example 1 of the FIG. 10 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

| FIRST TABLE: LAYER STRUCTURE - thicknesses (FIG. 10 embodiment) | | |
|---|---|---|
| Glass | CE | Ex. 1 |
| $SiZrN_x$ | 0 Å | 360 Å |
| $TiO_2$ | 125 Å | 0 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $SiZrN_x$ | 0 Å | 240 Å |
| $SnO_2$ | 672 Å | 667 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $SiZrN_x$ | 0 Å | 0 Å |
| $SnO_2$ | 227 Å | 399 Å |
| $Si_3N_4$ | 252 Å | 0 Å |
| $SiO_xN_y$ | 0 Å | 0 Å |
| $SiO_2$ | 0 Å | 0 Å |
| Total diel: | 1606 Å | 1666 Å |

| SECOND TABLE: OPTICAL PERFORMANCE (FIG. 10 embodiment; monolithic) | | | | | | | | |
|---|---|---|---|---|---|---|---|---|
| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
| Ex. 1: | 77.3% | −2.9 | 3.8 | 4.5% | 9.2 | −12.6 | 4.1% | 3.2 | −2.9 |
| CE: | 75.5% | −2.1 | 0.2 | 5.9% | 9.2 | −10.6 | 5.2% | 3.2 | −1.0 |

It can be seen from the Tables above regarding the FIG. 10 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 10) had better visible transmission (higher $T_{vis}$) and better glass and/or film side reflection (lower $R_g$ and/or $R_f$) than the Comparative Example (CE—see FIG. 1). Surprisingly, Example 1 also had fairly neutral transmissive color.

Figure 11:
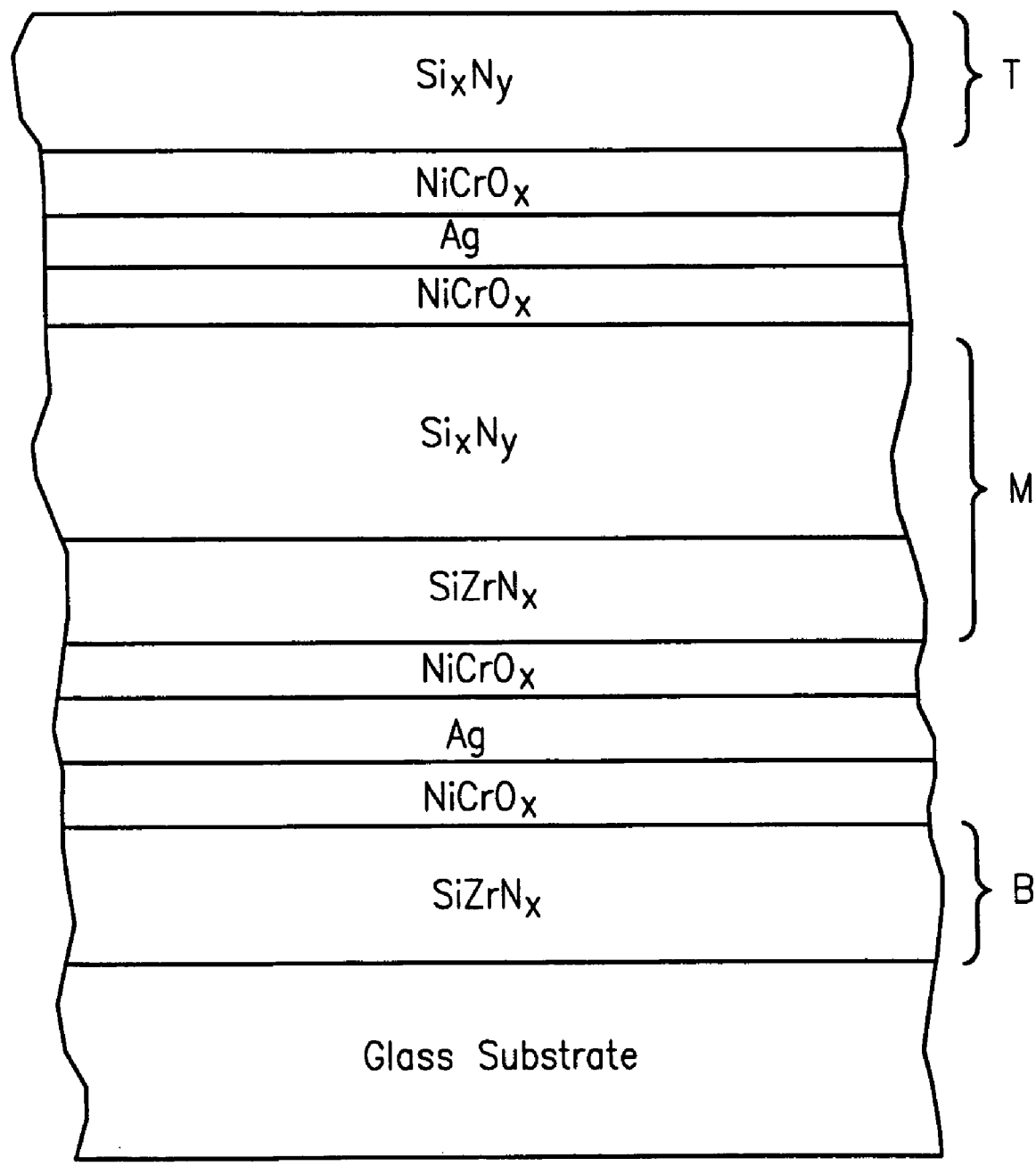
FIG. 11 is a cross sectional view of a coated article according to another embodiment of this invention.

FIG. 11 is a cross sectional view of a coated article according to another embodiment of this invention. The FIG. 11 embodiment differs from the FIG. 10 embodiment in that the upper and middle tin oxide layers from FIG. 10 are replaced with respective layers of or including silicon nitride (stoichiometric or non-stoichiometric). It is noted that the silicon zirconium nitride inclusive layers may be stoichiometric or non-stoichiometric in different embodiments of this invention. Moreover, one or more of the silicon zirconium nitride (SiZrN) layers may be oxidized, and/or may be replaced with layer(s) comprising niobium oxide (e.g., Nb$_2$O$_5$ or any other suitable form). The coated article of FIG. 11 includes from the glass substrate outwardly (all indices n at 550 nm):

- glass (n=1.51)
- silicon zirconium nitride (SiZrN$_x$) (n=2.2–2.45, preferably n=2.32)
- nickel-chromium-oxide (NiCrO$_x$)
- silver (Ag)
- nickel-chromium-oxide (NiCrO$_x$)
- silicon zirconium nitride (SiZrN$_x$) (n=2.2–2.45, preferably n=2.32)
- silicon nitride (e.g., Si$_3$N$_4$) (n=1.8 to 2.0, preferably n=2.0)
- nickel-chromium-oxide (NiCrO$_x$)
- silver (Ag)
- nickel-chromium-oxide (NiCrO$_x$)
- silicon nitride (e.g., Si$_3$N$_4$) (n=1.8 to 2.0, preferably n=2.0)
- air (n=1.0)

By using the silicon zirconium nitride and silicon nitride dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

FIRST TABLE: LAYER STRUCTURE - thicknesses
(FIG. 11 embodiment)

| Glass | CE | Ex. 1 |
|---|---|---|
| SiZrN$_x$ | 0 Å | 360 Å |
| TiO$_2$ | 125 Å | 0 Å |
| Si$_3$N$_4$ | 165 Å | 0 Å |
| NiCrO$_x$ | 18 Å | 18 Å |
| Ag | 98 Å | 98 Å |
| NiCrO$_x$ | 16 Å | 16 Å |
| SiZrN$_x$ | 0 Å | 229 Å |
| SnO$_2$ | 672 Å | 0 Å |
| Si$_3$N$_4$ | 165 Å | 684 Å |
| NiCrO$_x$ | 18 Å | 18 Å |
| Ag | 98 Å | 98 Å |
| NiCrO$_x$ | 16 Å | 16 Å |
| SiZrN$_x$ | 0 Å | 0 Å |
| SnO$_2$ | 227 Å | 0 Å |
| Si$_3$N$_4$ | 252 Å | 404 Å |
| SiO$_x$N$_y$ | 0 Å | 0 Å |
| SiO$_2$ | 0 Å | 0 Å |
| Total diel: | 1606 Å | 1677 Å |

EXAMPLE(S) OF FIG. 11 EMBODIMENT

The Tables below illustrate Example 1 of the FIG. 11 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

SECOND TABLE: OPTICAL PERFORMANCE
(FIG. 11 embodiment; monolithic)

| | T$_{vis}$ | a*$_t$ | b*$_t$ | R$_{glass\ side\ (g)}$ | a*$_g$ | b*$_g$ | R$_{film\ side\ (f)}$ | a*$_f$ | b*$_f$ |
|---|---|---|---|---|---|---|---|---|---|
| Ex. 1: | 77.3% | −2.6 | 3.4 | 4.5% | 9.0 | −12.3 | 4.1% | 3.9 | −2.7 |
| CE: | 75.5% | −2.1 | 0.2 | 5.9% | 9.2 | −10.6 | 5.2% | 3.2 | −1.0 |

It can be seen from the Tables above regarding the FIG. 11 embodiment of this invention, that the anti-reflection system of the instant invention enables not only better visible transmission characteristics (i.e., increased visible transmission T$_{vis}$ %), but also reduced reflection (e.g., lower glass side reflection and/or film side visible reflection). In particular, Example 1 (see FIG. 11) had better visible transmission (higher T$_{vis}$) and better glass and/or film side reflection (lower R$_g$ and/or R$_f$) than the Comparative Example (CE—see FIG. 1). Surprisingly, Example 1 also had fairly neutral color.

Figure 12:
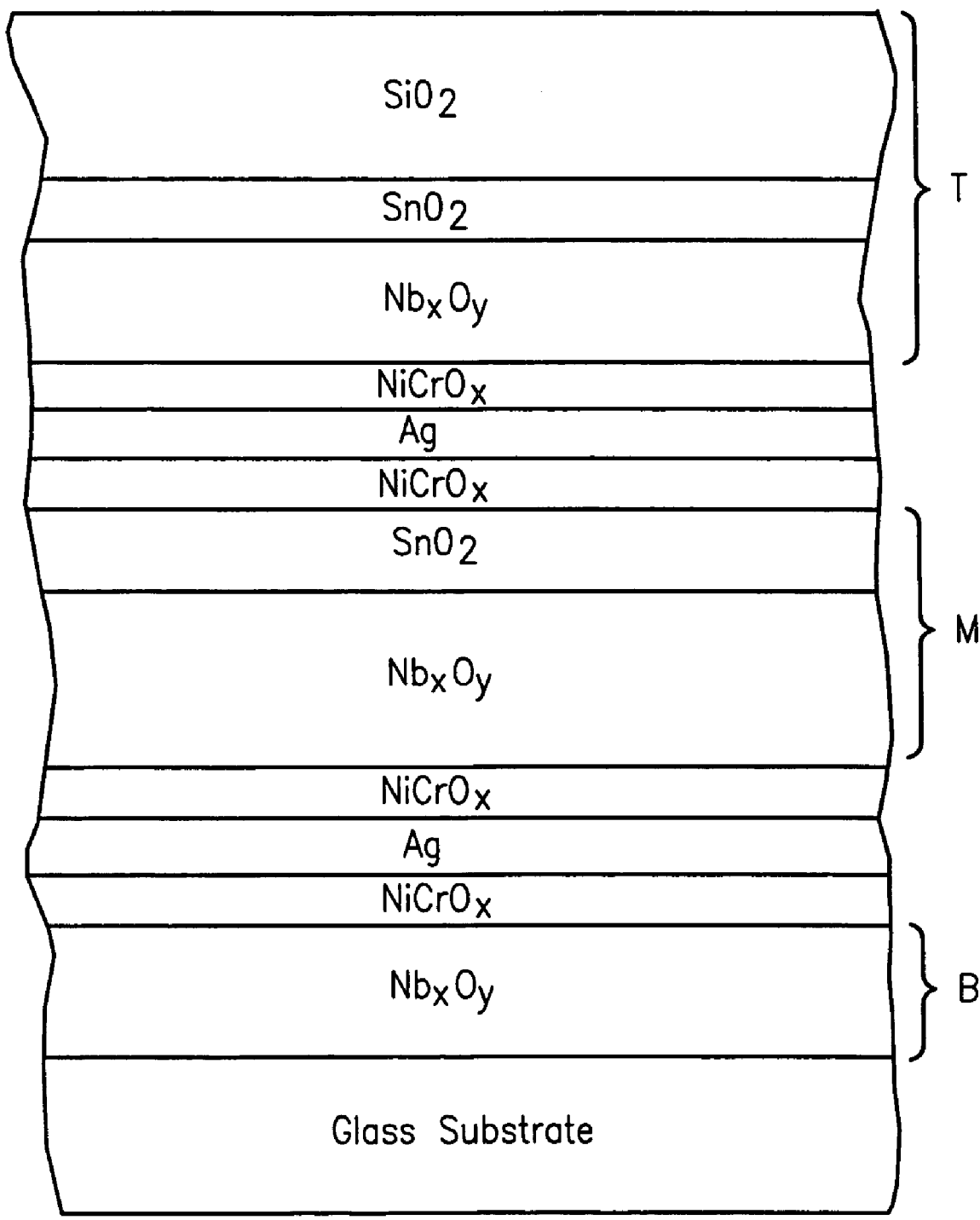
FIG. 12 is a cross sectional view of a coated article according to another embodiment of this invention.

FIG. 12 is a cross sectional view of a coated article according to another embodiment of this invention. The FIG. 12 embodiment differs from FIG. 1 in that (a) the bottom titanium oxide and silicon nitride layers in bottom portion B of FIG. 1 have been removed and replaced with a layer of or including niobium oxide (stoichiometric Nb$_2$O$_5$, or some non-stoichiometric form), (b) the silicon nitride layer in the middle portion M of FIG. 1 has been removed, (c) a layer of or including niobium oxide (stoichiometric $Nb_2O_5$, or some non-stoichiometic form) has been added to the middle dielectric portion M in FIG. 12, and (d) the top silicon nitride layer in top portion T in FIG. 1 has been replaced with a layer of or including silicon oxide (stoichiometric or non-stoichiometric) in FIG. 12. The coated article of FIG. 12 includes from the glass substrate outwardly (all indices n at 550 nm):

glass (n=1.51)
    niobium oxide (e.g., $Nb_2O_5$) (n=2.25–2.5, preferably n=2.33)
    nickel-chromium-oxide ($NiCrO_x$)
    silver (Ag)
    nickel-chromium-oxide ($NiCrO_x$)
    niobium oxide (e.g., $Nb_2O_5$) (n=2.25–2.5, preferably n=2.33)
    tin oxide (e.g., $SnO_2$) (n=1.8 to 2.2, preferably n=2.0)
    nickel-chromium-oxide ($NiCrO_x$)
    silver (Ag)
    nickel-chromium-oxide ($NiCrO_x$)
    niobium oxide (e.g., $Nb_2O_5$) (n=2.25–2.5, preferably n=2.33)
    tin oxide (e.g., $SnO_2$) (n=1.8 to 2.2, preferably n=2.0)
    silicon oxide (e.g., $SiO_2$) (n=1.4 to 1.7, preferably n=1.45)
    air (n=1.0)

By using the niobium oxide, silicon oxide, and tin oxide dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 12 EMBODIMENT

The Tables below illustrate Example 1 of the FIG. 12 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

| FIRST TABLE: LAYER STRUCTURE - thicknesses (FIG. 12 embodiment) | | |
|---|---|---|
| Glass | CE | Ex. 1 |
| $Nb_xO_y$ | 0 Å | 342 Å |
| $TiO_2$ | 125 Å | 0 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $Nb_xO_y$ | 0 Å | 640 Å |
| $SnO_2$ | 672 Å | 96 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $Nb_xO_y$ | 0 Å | 222 Å |
| $SnO_2$ | 227 Å | 37 Å |
| $Si_3N_4$ | 252 Å | 0 Å |
| $SiO_xN_y$ | 0 Å | 0 Å |
| $SiO_2$ | 0 Å | 372 Å |
| Total diel: | 1606 Å | 1709 Å |

| SECOND TABLE: OPTICAL PERFORMANCE (FIG. 12 embodiment; monolithic) | | | | | | | | | |
|---|---|---|---|---|---|---|---|---|---|
| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
| Ex. 1: | 78.5% | −1.3 | −0.3 | 4.6% | 8.2 | −8.6 | 4.0% | 3.7 | −2.4 |
| CE: | 75.5% | −2.1 | 0.2 | 5.9% | 9.2 | −10.6 | 5.2% | 3.2 | −1.0 |

It can be seen from the Tables above regarding the FIG. 12 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 12) had better visible transmission (higher $T_{vis}$) and better glass and/or film side reflection (lower $R_g$ and/or $R_f$) than the Comparative Example (CE—see FIG. 1). Surprisingly, Example 1 also had more neutral transmissive and glass side reflective color than the CE.

Figure 13:
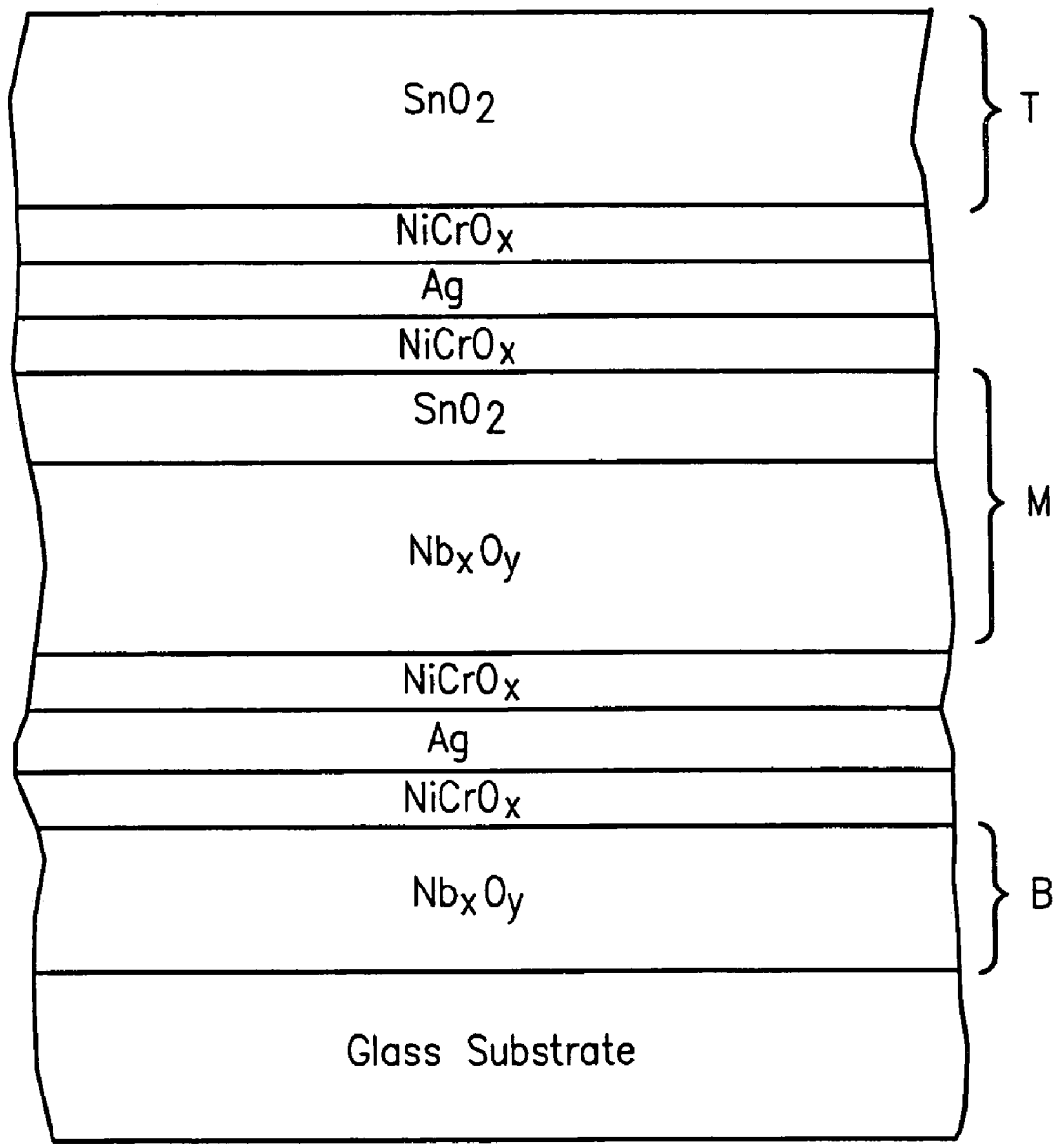
FIG. 13 is a cross sectional view of a coated article according to another embodiment of this invention.

FIG. 13 is a cross sectional view of a coated article according to another embodiment of this invention. The FIG. 13 embodiment differs from the FIG. 12 embodiment in that the top silicon oxide and niobium oxide layers in top dielectric portion T of FIG. 12 have been removed. The coated article of FIG. 13 includes from the glass substrate outwardly (all indices n at 550 nm):

glass (n=1.51)
    niobium oxide (e.g., $Nb_2O_5$) (n=2.25–2.5, preferably n=2.33)
    nickel-chromium-oxide ($NiCrO_x$)

silver (Ag)
nickel-chromium-oxide (NiCrO$_x$)
niobium oxide (e.g., Nb$_2$O$_5$) (n=2.25–2.5, preferably n=2.33)
tin oxide (e.g., SnO$_2$) (n=1.8 to 2.2, preferably n=2.0)
nickel-chromium-oxide (NiCrO$_x$)
silver (Ag)
nickel-chromium-oxide (NiCrO$_x$)
tin oxide (e.g., SnO$_2$) (n=1.8 to 2.2, preferably n=2.0)
air (n=1.0)

By using the niobium oxide and tin oxide dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 13 EMBODIMENT

The Tables below illustrate Example 1 of the FIG. 13 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

| FIRST TABLE: LAYER STRUCTURE - thicknesses (FIG. 13 embodiment) | | |
|---|---|---|
| Glass | CE | Ex. 1 |
| Nb$_x$O$_y$ | 0 Å | 347 Å |
| TiO$_2$ | 125 Å | 0 Å |
| Si$_3$N$_4$ | 165 Å | 0 Å |
| NiCrO$_x$ | 18 Å | 18 Å |
| Ag | 98 Å | 98 Å |
| NiCrO$_x$ | 16 Å | 16 Å |
| Nb$_x$O$_y$ | 0 Å | 639 Å |
| SnO$_2$ | 672 Å | 90 Å |
| Si$_3$N$_4$ | 165 Å | 0 Å |
| NiCrO$_x$ | 18 Å | 18 Å |
| Ag | 98 Å | 98 Å |
| NiCrO$_x$ | 16 Å | 16 Å |
| Nb$_x$O$_y$ | 0 Å | 0 Å |
| SnO$_2$ | 227 Å | 428 Å |
| Si$_3$N$_4$ | 252 Å | 0 Å |
| SiO$_x$N$_y$ | 0 Å | 0 Å |
| SiO$_2$ | 0 Å | 0 Å |
| Total diel: | 1606 Å | 1504 Å |

| SECOND TABLE: OPTICAL PERFORMANCE (FIG. 13 embodiment; monolithic) | | | | | | | | | |
|---|---|---|---|---|---|---|---|---|---|
| | T$_{vis}$ | a*$_t$ | b*$_t$ | R$_{glass\ side\ (g)}$ | a*$_g$ | b*$_g$ | R$_{film\ side\ (f)}$ | a*$_f$ | b*$_f$ |
| Ex. 1: | 78.4% | −1.5 | 0.1 | 4.6% | 9.0 | −9.9 | 4.1% | 3.2 | −2.6 |
| CE: | 75.5% | −2.1 | 0.2 | 5.9% | 9.2 | −10.6 | 5.2% | 3.2 | −1.0 |

It can be seen from the Tables above regarding the FIG. 13 embodiment of this invention, that the anti-reflection system of the instant invention enables not only better visible transmission characteristics (i.e., increased visible transmission T$_{vis}$ %), but also reduced reflection (e.g., lower glass side reflection and/or film side visible reflection). In particular, Example 1 (see FIG. 13) had better visible transmission (higher T$_{vis}$) and better glass and/or film side reflection (lower R$_g$ and/or R$_f$) than the Comparative Example (CE—see FIG. 1). Surprisingly, Example 1 also had more neutral transmissive and glass side reflective color than the CE.

Figure 14:
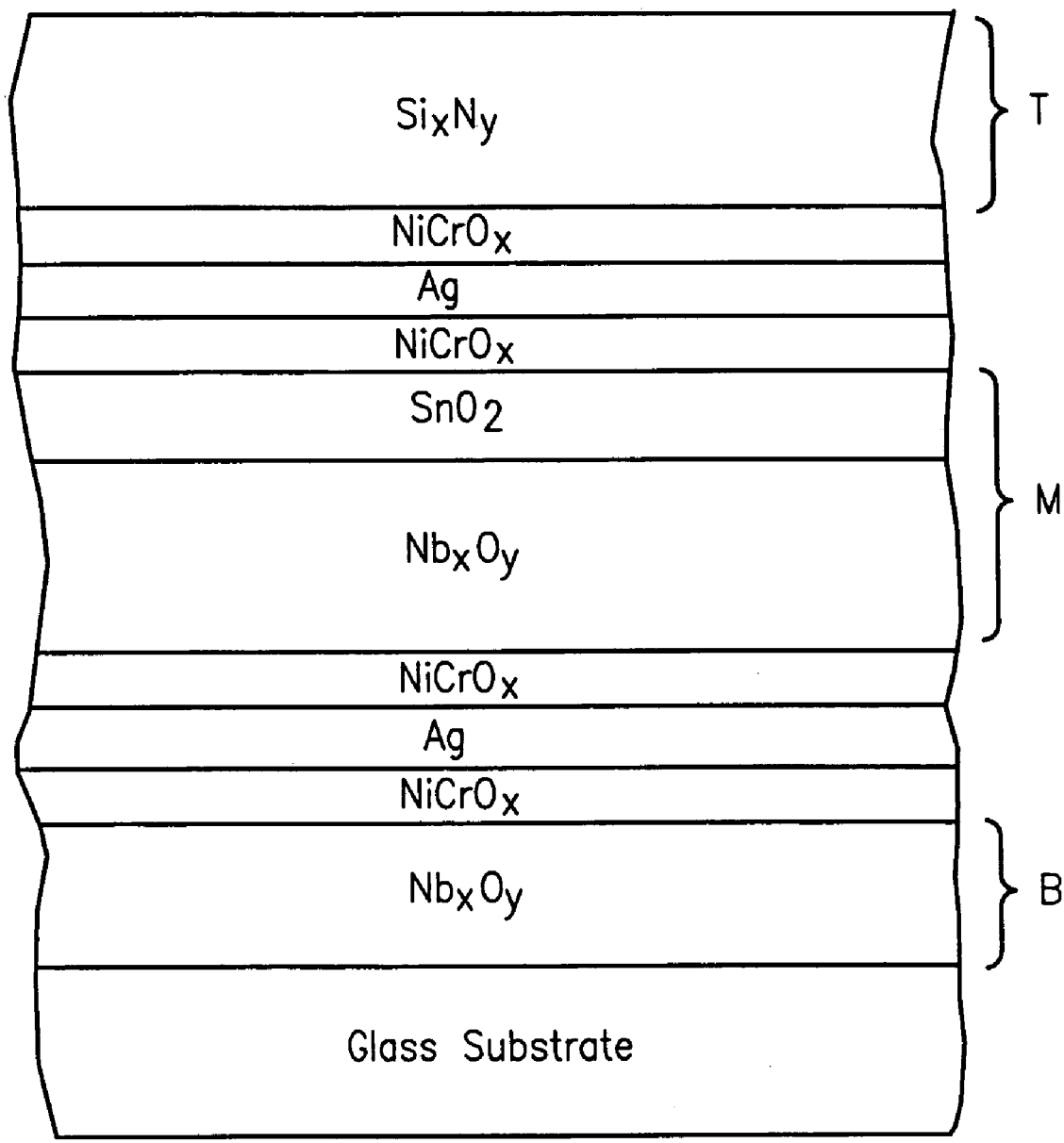
FIG. 14 is a cross sectional view of a coated article according to another embodiment of this invention.

FIG. 14 is a cross sectional view of a coated article according to another embodiment of this invention. The FIG. 14 embodiment differs from the FIG. 13 embodiment in that the top tin oxide layer of FIG. 13 has been replaced with a silicon nitride inclusive layer in FIG. 14. The coated article of FIG. 14 includes from the glass substrate outwardly (all indices n at 550 nm):

glass (n=1.51)
niobium oxide (e.g., Nb$_2$O$_5$) (n=2.25–2.5, preferably n=2.33)
nickel-chromium-oxide (NiCrO$_x$)
silver (Ag)
nickel-chromium-oxide (NiCrO$_x$)
niobium oxide (e.g., Nb$_2$O$_5$) (n=2.25–2.5, preferably n=2.33)
tin oxide (e.g., SnO$_2$) (n=1.8 to 2.2, preferably n=2.0)
nickel-chromium-oxide (NiCrO$_x$)
silver (Ag)
nickel-chromium-oxide (NiCrO$_x$)
silicon nitride (e.g., Si$_3$N$_4$) (n=1.8 to 2.0, preferably n=2.0)
air (n=1.0)

By using the niobium oxide, silicon nitride, and tin oxide dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments.

EXAMPLE(S) OF FIG. 14 EMBODIMENT

The Tables below illustrate Example 1 of the FIG. 14 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

FIRST TABLE: LAYER STRUCTURE - thicknesses
(FIG. 14 embodiment)

| Glass | CE | Ex. 1 |
|---|---|---|
| $Nb_xO_y$ | 0 Å | 344 Å |
| $TiO_2$ | 125 Å | 0 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $Nb_xO_y$ | 0 Å | 641 Å |
| $SnO_2$ | 672 Å | 89 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 16 Å |
| $Nb_xO_y$ | 0 Å | 0 Å |
| $SnO_2$ | 227 Å | 0 Å |
| $Si_3N_4$ | 252 Å | 428 Å |
| $SiO_xN_y$ | 0 Å | 0 Å |
| $SiO_2$ | 0 Å | 0 Å |
| Total diel: | 1606 Å | 1502 Å |

It can be seen from the Tables above regarding the FIG. 14 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 14) had better visible transmission (higher $T_{vis}$) and better glass and/or film side reflection (lower $R_g$ and/or $R_f$) than the Comparative Example (CE—see FIG. 1). Surprisingly, Example 1 also had more neutral transmissive and glass side reflective color than the CE.

Figure 15:
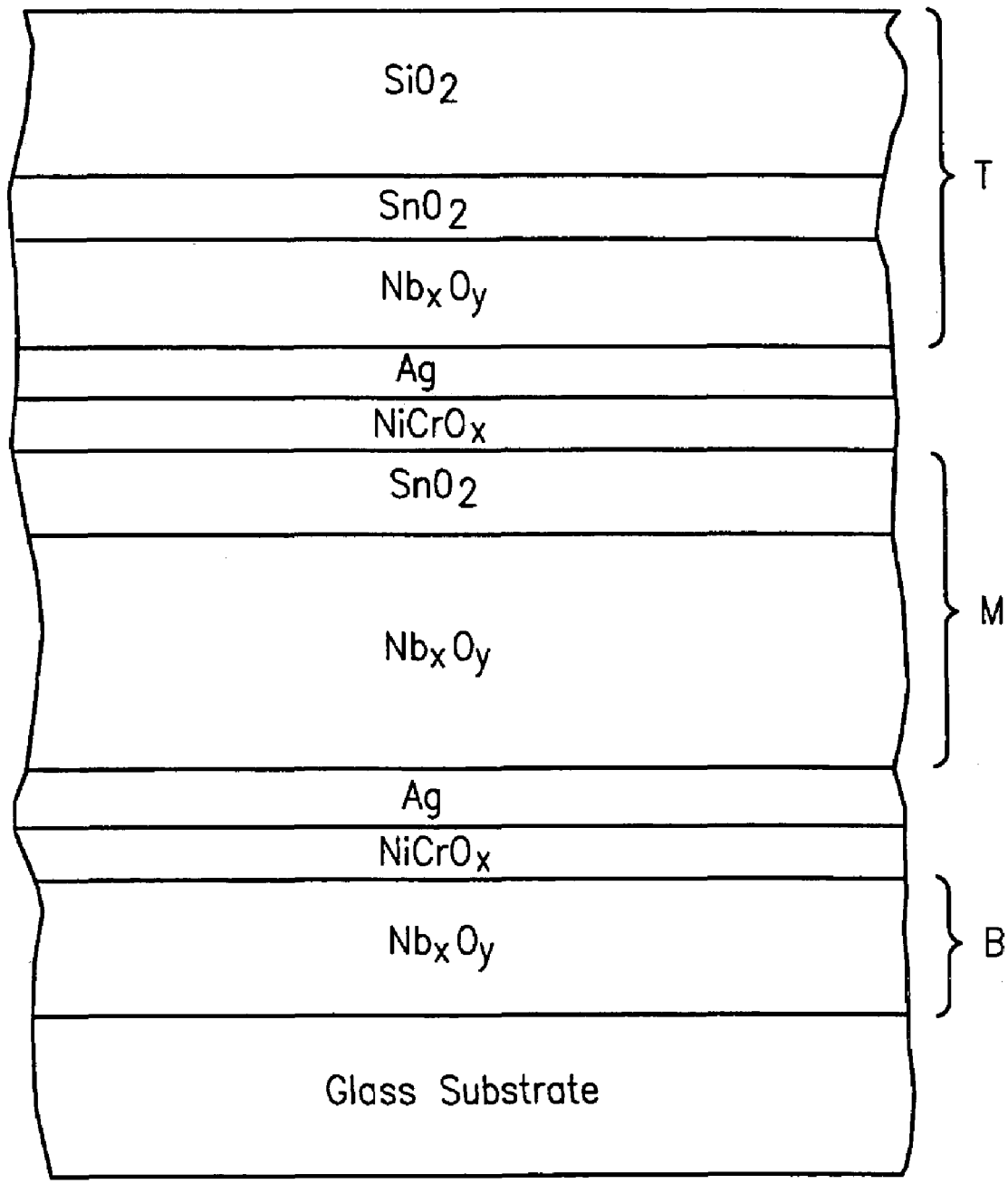
FIG. 15 is a cross sectional view of a coated article according to another embodiment of this invention.

FIG. 15 is a cross sectional view of a coated article according to another embodiment of this invention. The FIG. 15 embodiment differs from the FIG. 12 embodiment in that the two upper nickel chrome oxide contact layers have been removed from the FIG. 12 embodiment. The coated article of FIG. 15 includes from the glass substrate outwardly (all indices n at 550 nm):

glass (n=1.51)
niobium oxide (e.g., $Nb_2O_5$) (n=2.25–2.5, preferably n=2.33)
nickel-chromium-oxide ($NiCrO_x$)
silver (Ag)
niobium oxide (e.g., $Nb_2O_5$) (n=2.25–2.5, preferably n=2.33)
tin oxide (e.g., $SnO_2$) (n=1.8 to 2.2, preferably n=2.0)
nickel-chromium-oxide ($NiCrO_x$)
silver (Ag)
niobium oxide (e.g., $Nb_2O_5$) (n=2.25–2.5, preferably n=2.33)
tin oxide (e.g., $SnO_2$) (n=1.8 to 2.2, preferably n=2.0)
silicon oxide (e.g., $SiO_2$) (n=1.4 to 1.7, preferably n=1.45)
air (n=1.0)

By using the niobium oxide, silicon oxide, and tin oxide dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Sur- SECOND TABLE: OPTICAL PERFORMANCE
(FIG. 14 embodiment; monolithic)

| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. 1: | 78.3% | −1.4 | 0.0 | 4.6% | 8.7 | −9.3 | 4.1% | 3.4 | −2.5 |
| CE: | 75.5% | −2.1 | 0.2 | 5.9% | 9.2 | −10.6 | 5.2% | 3.2 | −1.0 | prisingly, the anti-reflection system may also enable fairly neutral color of the coated article in certain example embodiments.

EXAMPLE(S) OF FIG. 15 EMBODIMENT

The Tables below illustrate Example 1 of the FIG. 15 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

FIRST TABLE: LAYER STRUCTURE - thicknesses
(FIG. 15 embodiment)

| Glass | CE | Ex. 1 |
|---|---|---|
| $Nb_xO_y$ | 0 Å | 337 Å |
| $TiO_2$ | 125 Å | 0 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 0 Å |
| $Nb_xO_y$ | 0 Å | 564 Å |
| $SnO_2$ | 672 Å | 169 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 0 Å |
| $Nb_xO_y$ | 0 Å | 209 Å |
| $SnO_2$ | 227 Å | 50 Å |
| $Si_3N_4$ | 252 Å | 0 Å |
| $SiO_xN_y$ | 0 Å | 0 Å |
| $SiO_2$ | 0 Å | 379 Å |
| Total diel: | 1606 Å | 1708 Å |

SECOND TABLE: OPTICAL PERFORMANCE
(FIG. 15 embodiment; monolithic)

| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. 1: | 82.1% | −1.1 | −0.8 | 4.5% | 4.0 | −3.9 | 3.8% | 1.4 | −1.8 |
| CE: | 75.5% | −2.1 | 0.2 | 5.9% | 9.2 | −10.6 | 5.2% | 3.2 | −1.0 |

It can be seen from the Tables above regarding the FIG. 15 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 15) had better visible transmission (higher $T_{vis}$) and better glass and/or film side reflection (lower $R_g$ and/or $R_f$) than the Comparative Example (CE—see FIG. 1). Surprisingly, Example 1 also had more neutral color than the CE.

Figure 16:
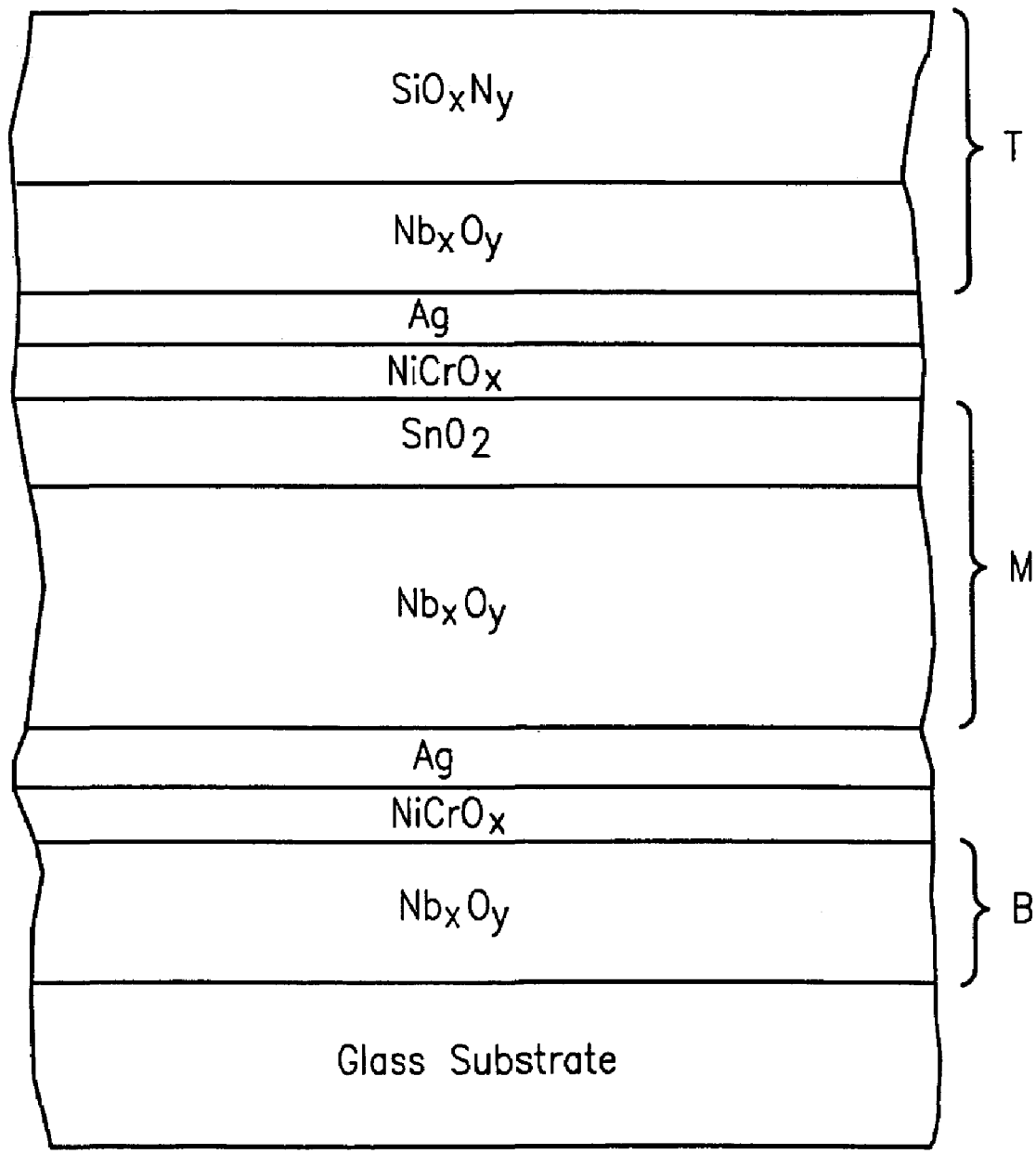
FIG. 16 is a cross sectional view of a coated article according to another embodiment of this invention.

FIG. 16 is a cross sectional view of a coated article according to another embodiment of this invention. The FIG. 16 embodiment differs from the FIG. 15 embodiment in that the upper silicon oxide and tin oxide layers in top dielectric portion T have been replaced with a layer of or including silicon oxynitride. The coated article of FIG. 16 includes from the glass substrate outwardly (all indices n at 550 nm):

glass (n=1.51)
niobium oxide (e.g., $Nb_2O_5$) (n=2.25–2.5, preferably n=2.33)
nickel-chromium-oxide ($NiCrO_x$)
silver (Ag)
niobium oxide (e.g., $Nb_2O_5$) (n=2.25–2.5, preferably n=2.33)
tin oxide (e.g., $SnO_2$) (n=1.8 to 2.2, preferably n=2.0)
nickel-chromium-oxide ($NiCrO_x$)
silver (Ag)
niobium oxide (e.g., $Nb_2O_5$) (n=2.25–2.5, preferably n=2.33)
silicon oxynitride (e.g., $SiO_xN_y$) (n=1.45–2.0, preferably n=1.6–1.9)
air (n=1.0)

By using the niobium oxide, silicon oxynitride, and tin oxide dielectric layers as shown in this embodiment, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments. The silicon oxynitride layer is beneficial in that its index of refraction n (at 550 nm) can be varied from 1.45 to 2.0, more preferably from 1.6 to 1.9, and most preferably from 1.65 to 1.85, in different embodiments of this invention. In this and all other silicon oxynitride inclusive embodiments herein, the silicon oxynitride layer may have a constant (or approximately constant, i.e., constant plus/minus about 5%) index of refraction n throughout its entire thickness in certain embodiments of this invention, but alternatively may be oxidation and/or nitride graded so as to have an index of refraction n which varies through the thickness of the layer (e.g., the index n may gradually decrease through the thickness of the silicon oxynitride layer moving toward the air).

EXAMPLE(S) OF FIG. 16 EMBODIMENT

The Tables below illustrate Example 1 of the FIG. 16 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

FIRST TABLE: LAYER STRUCTURE - thicknesses (FIG. 16 embodiment)

| Glass | CE | Ex. 1 |
|---|---|---|
| $Nb_xO_y$ | 0 Å | 342 Å |
| $TiO_2$ | 125 Å | 0 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 0 Å |
| $Nb_xO_y$ | 0 Å | 554 Å |
| $SnO_2$ | 672 Å | 188 Å |
| $Si_3N_4$ | 165 Å | 0 Å |
| $NiCrO_x$ | 18 Å | 18 Å |
| Ag | 98 Å | 98 Å |
| $NiCrO_x$ | 16 Å | 0 Å |
| $Nb_xO_y$ | 0 Å | 182 Å |
| $SnO_2$ | 227 Å | 0 Å |
| $Si_3N_4$ | 252 Å | 0 Å |
| $SiO_xN_y$ | 0 Å | 336 Å |
| $SiO_2$ | 0 Å | 0 Å |
| Total diel: | 1606 Å | 1602 Å |

SECOND TABLE: OPTICAL PERFORMANCE (FIG. 16 embodiment; monolithic)

| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. 1: | 82.0% | −1.1 | −0.7 | 4.6% | 4.5 | −4.6 | 3.9% | 1.5 | −1.8 |
| CE: | 75.5% | −2.1 | 0.2 | 5.9% | 9.2 | −10.6 | 5.2% | 3.2 | −1.0 |

It can be seen from the Tables above regarding the FIG. 16 embodiment of this invention, that the anti-reflection system of the instant invention enables not only better visible transmission characteristics (i.e., increased visible transmission $T_{vis}$ %), but also reduced reflection (e.g., lower glass side reflection and/or film side visible reflection). In particular, Example 1 (see FIG. 16) had better visible transmission (higher $T_{vis}$) and better glass and/or film side reflection (lower $R_g$ and/or $R_f$) than the Comparative Example (CE—see FIG. 1). Surprisingly, Example 1 also had more neutral color than the CE (especially glass side reflective color).

Figure 17:
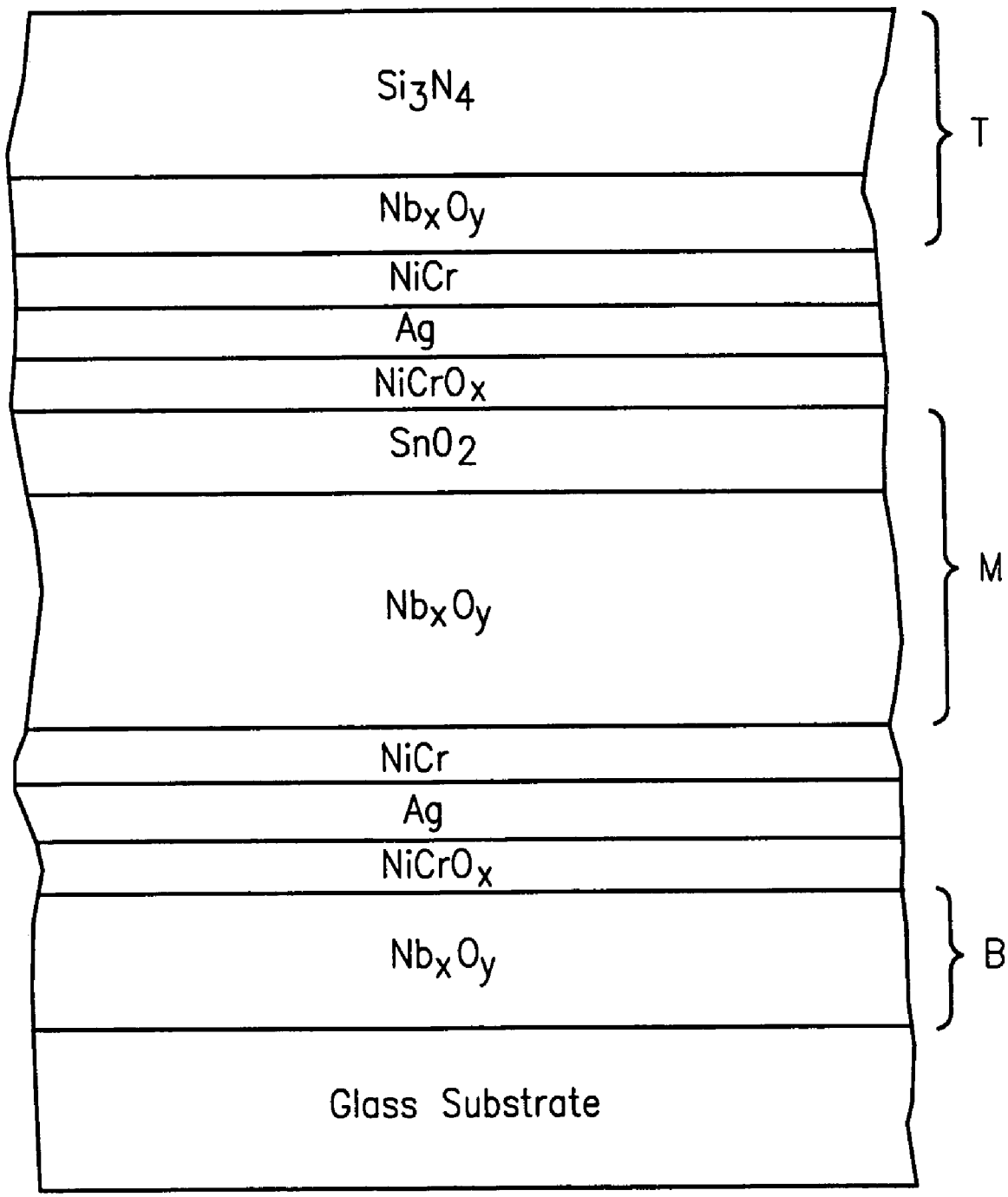
FIG. 17 is a cross sectional view of a coated article according to another embodiment of this invention.

FIG. 17 is a cross sectional view of a coated article according to another embodiment of this invention. The FIG. 17 embodiment differs from the FIG. 14 embodiment in that an additional niobium oxide layer has been added to the top dielectric portion T, and the two top contact layers were NiCr (i.e. not significantly oxidized). The coated article of FIG. 17 includes from the glass substrate outwardly (all indices n at 550 nm):

glass (n=1.51)
niobium oxide (e.g., $Nb_2O_5$) (n=2.25–2.5, preferably n=2.33)
nickel-chromium-oxide ($NiCrO_x$)
silver (Ag)
nickel-chromium (NiCr)
niobium oxide (e.g., $Nb_2O_5$) (n=2.25–2.5, preferably n=2.33)
tin oxide (e.g., $SnO_2$) (n=1.8 to 2.2, preferably n=2.0)
nickel-chromium-oxide ($NiCrO_x$)
silver (Ag)
nickel-chromium (NiCr)
niobium oxide (e.g., $Nb_2O_5$) (n=2.25–2.5, preferably n=2.33)
silicon nitride (e.g., $Si_3N_4$) (n=1.8 to 2.0, preferably n=2.0)
air (n=1.0)

By using the niobium oxide, silicon nitride, and tin oxide dielectric layers as shown in this embodiment, the layer system can be characterized by the top dielectric portion T having an effective index of refraction n less than or equal to that of middle dielectric portion M, which in turn has an effective index of refraction n less than or equal to that of the bottom dielectric portion B. In other words, $n_T <= n_M <= n_B$, where $n_T$ is the effective index of refraction of the top dielectric portion T, $n_M$ is the effective index of refraction of the middle dielectric portion M, and $n_B$ is the effective index of refraction of the bottom dielectric portion B. Each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of this embodiment enables increased visible transmission to be achieved. Surprisingly, the anti-reflection system may also enable fairly neutral color of the coated article in certain example embodiments. While the two upper contact layers were NiCr (not significantly oxidized) in this embodiment, it will be recognized by those skilled in the art that in other embodiments of this invention these NiCr contact layers may be nitrided.

EXAMPLE(S) OF FIG. 17 EMBODIMENT

The Tables below illustrate Example 1 of the FIG. 17 embodiment, compared to a Comparative Example(s) (CE) similar to FIG. 1 of the instant application. The CE relates to a coating that is similar to that illustrated in the Ser. No. 09/794,224 application. The thicknesses for each of the layers in the First Table below are in angstroms (Å). The Second Table below sets forth the optical characteristics (e.g., visible transmission, color, etc.) for Example 1 and the CE based upon being annealed and in monolithic form.

FIRST TABLE: LAYER STRUCTURE - thicknesses
(FIG. 17 embodiment)

| Glass | CE | Ex. 1 |
|---|---|---|
| Nb$_x$O$_y$ | 0 Å | 346 Å |
| TiO$_2$ | 125 Å | 0 Å |
| Si$_3$N$_4$ | 165 Å | 0 Å |
| NiCrO$_x$ | 18 Å | 18 Å |
| Ag | 98 Å | 98 Å |
| NiCrO$_x$ | 16 Å | 0 Å |
| NiCr | 0 Å | 3 Å |
| Nb$_x$O$_y$ | 0 Å | 652 Å |
| SnO$_2$ | 672 Å | 108 Å |
| Si$_3$N$_4$ | 165 Å | 0 Å |
| NiCrO$_x$ | 18 Å | 18 Å |
| Ag | 98 Å | 98 Å |
| NiCrO$_x$ | 16 Å | 0 Å |
| NiCr | 0 Å | 3 Å |
| Nb$_x$O$_y$ | 0 Å | 88 Å |
| SnO$_2$ | 227 Å | 0 Å |
| Si$_3$N$_4$ | 252 Å | 350 Å |
| SiO$_x$N$_y$ | 0 Å | 0 Å |
| SiO$_2$ | 0 Å | 0 Å |
| Total diel: | 1606 Å | 1544 Å |

SECOND TABLE: OPTICAL PERFORMANCE
(FIG. 17 embodiment; monolithic)

| | T$_{vis}$ | a*$_t$ | b*$_t$ | R$_{glass\ side\ (g)}$ | a*$_g$ | b*$_g$ | R$_{film\ side\ (f)}$ | a*$_f$ | b*$_f$ |
|---|---|---|---|---|---|---|---|---|---|
| Ex. 1: | 77.3% | −1.8 | −0.8 | 4.7% | 10.3 | −10.7 | 4.4% | 4.1 | −2.8 |
| CE: | 75.5% | −2.1 | 0.2 | 5.9% | 9.2 | −10.6 | 5.2% | 3.2 | −1.0 |

It can be seen from the Tables above regarding the FIG. 17 embodiment of this invention, that the anti-reflection system of the instant invention enables not only better visible transmission characteristics (i.e., increased visible transmission T$_{vis}$ %), but also reduced reflection (e.g., lower glass side reflection and/or film side visible reflection). In particular, Example 1 (see FIG. 17) had better visible transmission (higher T$_{vis}$) and better glass and/or film side reflection (lower R$_g$ and/or R$_f$) than the Comparative Example (CE—see FIG. 1). Fairly neutral transmissive color was also provided in Example 1.

Accordingly, coated articles of certain example embodiments of this invention are characterized by one or more of the following parameters:

| Characteristic | General | More Preferred | Most Preferred |
|---|---|---|---|
| T$_{vis}$ (Ill. C. 2 deg.): | >=70% | >=75% | >=76.5% |
| R$_g$Y (Ill. C., 2 deg.): | <=11% | <=9% | <=5.0% |
| R$_f$Y (Ill. C.; 2 deg.): | <=11% | <=9% | <=5.0% |
| T$_{solar}$: | <=50% | <=48% | |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example and without limitation, materials other than those described above may be used in other embodiments of this invention without departing from the spirit of this invention. For example and without limitation, silicon oxide layers may be at least partially nitrided in certain embodiments, and silicon nitride layers may be at least partially oxidized in certain embodiments.

The invention claimed is:

1. A coated article including a coating supported by a glass substrate, the coating comprising, from the glass substrate outwardly:

a first dielectric layer comprising silicon zirconium nitride;

a first contact layer comprising NiCr;

a first IR reflecting layer comprising Ag;

a second contact layer comprising NiCr;

a second dielectric layer comprising silicon zirconium nitride;

a third dielectric layer having an index of refraction n less than an index of refraction n of at least one of the first and second dielectric layers;

a third contact layer comprising NiCr;

a second IR reflecting layer comprising Ag;

a fourth contact layer comprising NiCr;

a fourth dielectric layer comprising silicon oxide; and wherein the coated article has a visible transmission of at least 70% and a sheet resistance (R$_s$) of no greater than 10 ohms/square.

2. The coated article of claim 1, wherein the coated article has a visible transmission of at least 75%.

3. The coated article of claim 1, wherein the third dielectric layer comprises tin oxide.

4. The coated article of claim 3, wherein the coated article has a visible transmission of at least 76.5%.

5. The coated article of claim 1, further comprising another dielectric layer comprising tin oxide provided between the fourth dielectric layer comprising silicon oxide and the fourth contact layer.

6. The coated article of claim 5, further comprising another dielectric layer comprising silicon zirconium nitride provided between the fourth dielectric layer comprising silicon oxide and the second IR reflecting layer, the another dielectric layer comprising silicon zirconium nitride being provided under the another dielectric layer comprising tin oxide.

7. A coated article including a coating supported by a glass substrate, the coating comprising, from the glass substrate outwardly:

a first dielectric layer comprising silicon zirconium nitride;

a contact layer;

a first IR reflecting layer comprising Ag;

a second dielectric layer comprising silicon zirconium nitride;

a third dielectric layer having an index of refraction n less than an index of refraction of at least one of the first and second dielectric layers;

a contact layer, at least one of the contact layers comprising an oxide and/or nitride of NiCr;

a second IR reflecting layer comprising Ag;

a fourth dielectric layer comprising at least one of tin oxide and silicon nitride; and wherein the coated article has a visible transmission of at least 70% and a sheet resistance ($R_s$) of no greater than 10 ohms/square.

8. The coated article of claim 7, wherein the third dielectric layer comprises one of silicon nitride and tin oxide.

9. The coated article of claim 7, wherein the coated article has a visible transmission of at least 75%.

10. A coated article including a coating supported by a glass substrate, the coating comprising:

first and second infrared (IR) reflecting layers each comprising at least one of Ag and Au;

a first dielectric portion having an effective index of refraction $n_1 <= 3.0$ provided between the first IR reflecting layer and the glass substrate;

a second dielectric portion having an effective index of refraction $n_2$ less than or equal to $n_1$, the second dielectric portion provided between the first and second IR reflecting layers;

a third dielectric portion provided over the first and second IR reflecting layers, said third dielectric layer having an effective index of refraction $n_3$ less than $n_1$ and $n_2$, so that $n_3 < n_2 <= n_1$;

wherein the coated article has a visible transmission of at least 70%; and wherein the third dielectric portion comprises a layer comprising silicon zirconium nitride and a layer comprising silicon oxide.

11. A coated article including a coating supported by a glass substrate, the coating comprising:

first and second infrared (IR) reflecting layers each comprising at least one of Ag and Au;

a first dielectric portion having an effective index of refraction $n_1 <= 3.0$ provided between the first IR reflecting layer and the glass substrate;

a second dielectric portion having an effective index of refraction $n_2$ less than or equal to $n_1$, the second dielectric portion provided between the first and second IR reflecting layers;

a third dielectric portion provided over the first and second IR reflecting layers, said third dielectric layer having an effective index of refraction $n_3$ less than $n_1$ and $n_2$, so that $n_3 < n_2 <= n_1$;

wherein the coated article has a visible transmission of at least 70%; and wherein the second dielectric portion comprises a layer comprising tin oxide and a layer comprising one of niobium oxide and silicon zirconium nitride.

* * * * *